United States Patent
Kimchi et al.

(10) Patent No.: US 11,338,932 B1
(45) Date of Patent: May 24, 2022

(54) ADJUSTABLE UNMANNED AERIAL VEHICLES WITH ADJUSTABLE BODY PORTIONS

(71) Applicant: Amazon Technologies, Inc., Seattle, WA (US)

(72) Inventors: Gur Kimchi, Seattle, WA (US); Daniel Buchmueller, Seattle, WA (US); Brian C. Beckman, Newcastle, WA (US); Amir Navot, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 273 days.

(21) Appl. No.: 16/808,234

(22) Filed: Mar. 3, 2020

Related U.S. Application Data

(60) Continuation of application No. 16/287,833, filed on Feb. 27, 2019, which is a continuation of application No. 15/851,545, filed on Dec. 21, 2017, now Pat. No. 10,259,591, which is a continuation of application No. 15/592,948, filed on May 11, 2017, now Pat. No. 9,908,632, which is a division of application No. 14/467,716, filed on Aug. 25, 2014, now Pat. No. 9,676,477.

(51) Int. Cl.
| | |
|---|---|
| *G05D 1/00* | (2006.01) |
| *B64D 31/06* | (2006.01) |
| *B64C 39/02* | (2006.01) |
| *G05D 1/08* | (2006.01) |
| *B64C 1/30* | (2006.01) |

(52) U.S. Cl.
CPC ............ *B64D 31/06* (2013.01); *B64C 1/30* (2013.01); *B64C 39/024* (2013.01); *G05D 1/0858* (2013.01); *B64C 2201/027* (2013.01); *B64C 2201/141* (2013.01)

(58) Field of Classification Search
CPC ......... B64D 31/06; B64C 1/30; B64C 39/024; B64C 2201/027; B64C 2201/141; G05D 1/0858
See application file for complete search history.

(56) References Cited

U.S. PATENT DOCUMENTS

| | | | |
|---|---|---|---|
| 9,061,558 B2 | 6/2015 | Kalantari et al. | |
| 9,409,642 B1 | 8/2016 | Pingree | |
| 9,676,477 B1* | 6/2017 | Kimchi | B64C 39/024 |
| 9,682,316 B2 | 6/2017 | Condon et al. | |
| 9,815,552 B1 | 11/2017 | Welsh | |
| 10,116,187 B1 | 10/2018 | Wishart | |
| 2011/0315806 A1 | 12/2011 | Piasecki et al. | |
| 2013/0206915 A1 | 8/2013 | Desaulniers | |
| 2013/0320133 A1 | 12/2013 | Ratti et al. | |
| 2014/0263823 A1 | 9/2014 | Wang et al. | |
| 2014/0367509 A1 | 12/2014 | Smith | |
| 2015/0302858 A1 | 10/2015 | Hearing et al. | |
| 2016/0018822 A1 | 1/2016 | Nevdahs et al. | |
| 2018/0094931 A1 | 4/2018 | Taylor et al. | |
| 2018/0094933 A1 | 4/2018 | Kushleyev et al. | |
| 2018/0170510 A1* | 6/2018 | Brock | B64C 1/063 |
| 2021/0232141 A1* | 7/2021 | Georgeson | G08G 5/003 |

OTHER PUBLICATIONS http://www.geek.com/science/weve-been-designing-quadcopters-incorrectly-since-day-one-1577256/.

* cited by examiner

*Primary Examiner* — Adam M Alharbi
(74) *Attorney, Agent, or Firm* — Athorus, PLLC

(57) ABSTRACT

This disclosure describes an unmanned aerial vehicle that may be configured during flight to optimize for agility or efficiency.

20 Claims, 15 Drawing Sheets

ADJUSTABLE UNMANNED AERIAL VEHICLES WITH ADJUSTABLE BODY PORTIONS

CROSS-REFERENCE TO RELATED APPLICATIONS

This application is a continuation of and claims priority to U.S. application Ser. No. 16/287,833, filed Feb. 27, 2019, which is a continuation of and claims priority to U.S. application Ser. No. 15/851,545, filed Dec. 21, 2017, which is a continuation of and claims priority to U.S. application Ser. No. 15/592,948, filed May 11, 2017, which is a divisional of and claims priority to U.S. application Ser. No. 14/467,716, filed Aug. 25, 2014, each of which is incorporated herein by reference in their entirety.

BACKGROUND

Unmanned aerial vehicles, such as aerial, ground and water based automated vehicles, are continuing to increase in use. For example, unmanned aerial vehicles (UAVs) are often used by hobbyists to obtain aerial images of buildings, landscapes, etc. Likewise, mobile drive units, such as those provided by Kiva Systems, Inc., are often used in materials handling facilities to autonomously transport inventory within the facility. While there are many beneficial uses of these vehicles, they also have many drawbacks. For example, due to current design limitations, unmanned aerial vehicles are typically designed for either agility or efficiency, but not both.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
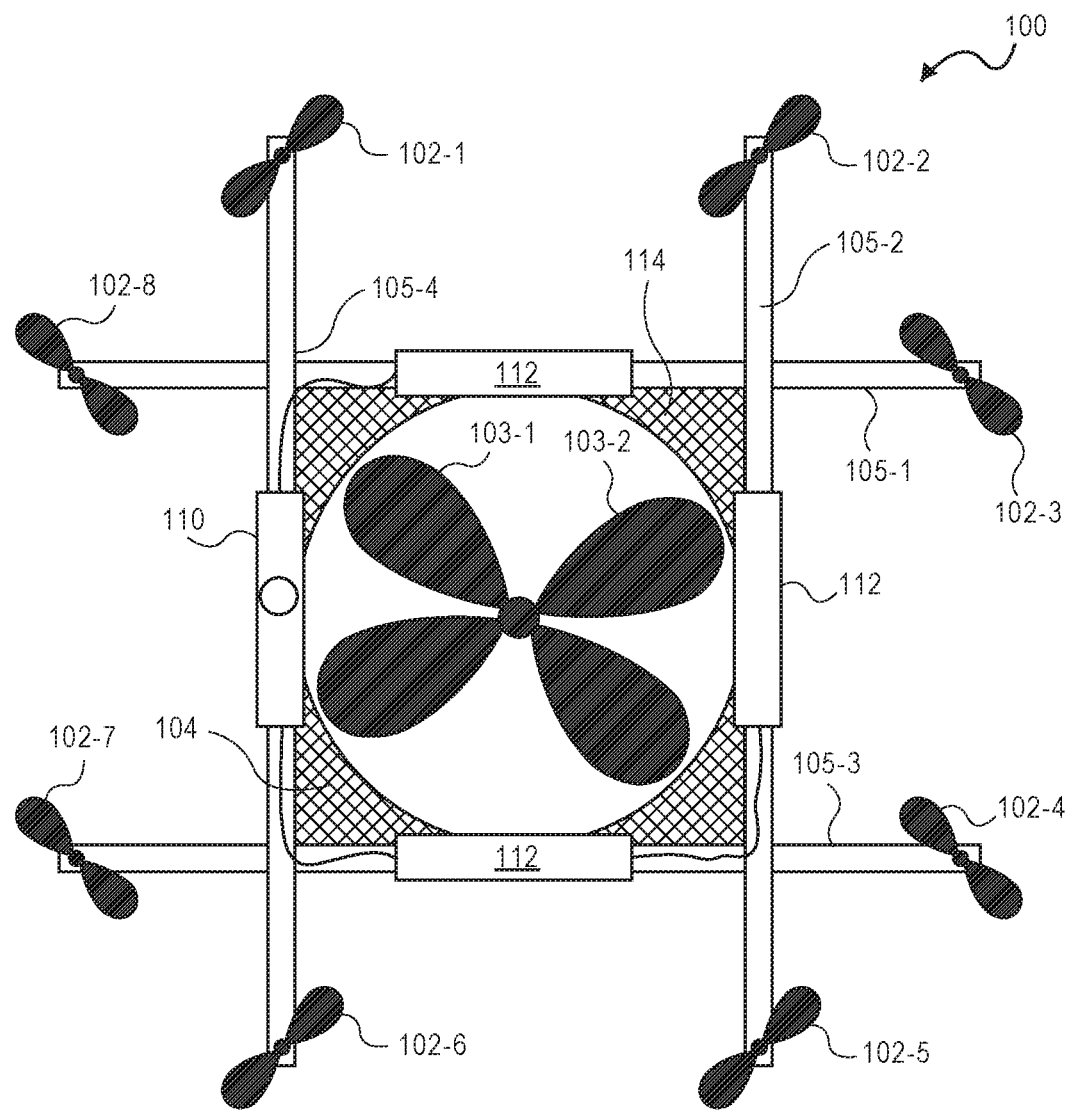
FIG. 1 depicts a block diagram of a top-down view of an unmanned aerial vehicle, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an unmanned aerial vehicle ("UAV") and system for automatically adjusting the configuration of the UAV. During transport, UAVs often need different capabilities (e.g., maneuverability, power efficiency) depending on their position and/or their profile. For example, when a UAV is landing, taking off, or in an area with many objects (e.g., a dense area such as a neighborhood, street, etc.), the UAV needs to be compact and agile so that it can avoid colliding with other objects (stationary and/or moving). In comparison, when a UAV is at a high altitude, traveling at a high velocity (e.g., at a cruising altitude), in an area where there are no or few objects, efficiency and power conservation are desirable.

Typical UAVs are designed for agility, efficiency or some middle-point between the two. The implementations described herein provide a UAV and accompanying system that can reconfigure the UAV during flight to optimize for agility, efficiency, or any other desired characteristic. In some implementations, the UAV may have one or more lifting motors and lifting propellers and several maneuverability motors and maneuverability propellers. The lifting motors may be designed with larger, more efficient motors than the maneuverability motors, and the lifting propellers may have a larger diameter than the maneuverability propellers. The lifting motors provide a primary purpose of providing lift and power efficiency to the UAV. For example, the lifting motors may be positioned toward the center of the body of the UAV.

In comparison, the maneuverability motors may be configured with smaller, more agile, motors, and the maneuverability propellers may be smaller propellers designed for providing high agility and maneuverability for the UAV. The maneuverability motors provide a primary purpose of guiding the UAV and providing high agility when needed. For example, when high agility is needed, the lifting motor(s) may be shut down and the UAV may be navigated using the maneuverability motors and maneuverability propellers. In comparison, when agility is not as important and power efficiency is desirable, the lifting motor may be engaged to provide extra lift to the UAV. The maneuverability motors may then be operated at a lower power draw and/or some of the maneuverability motors may be stopped.

In addition to, or as an alternative to utilizing lifting motors/propellers in combination with maneuverability motors/propellers, the position of one or more of the propellers may be adjustable with respect to the body of the UAV. For example, one or more of the maneuverability motors and maneuverability propellers and/or the lifting motor(s) and lifting propeller(s) may be horizontally, vertically and/or rotationally moved with respect to the body of the UAV while the UAV is in flight. In one implementation, the motor arms that connect the motors to the body of the UAV may be moved between an expanded position and a contracted position. In other implementations, the motor arms may be rotated, thereby rotating the motors and propellers with respect to the body of the UAV.

While the examples discussed herein primarily focus on UAVs in the form of an aerial vehicle utilizing multiple propellers to achieve flight (e.g., a quad-copter, octo-copter), it will be appreciated that the implementations discussed herein may be used with other forms and/or configurations of UAVs.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items (also referred to herein as a payload) may be delivered. For example, the delivery location may be a person's residence, a place of business, a location within a materials handling facility (e.g., packing station, inventory storage), or any location where a user or inventory is located, etc. Inventory or items may be any physical goods that can be transported using a UAV.

FIG. 1 illustrates a block diagram of a top-down view of an UAV 100, according to an implementation. The UAV 100 includes eight maneuverability propellers 102-1, 102-2, 102-3, 102-4, 102-5, 102-6, 102-7, 102-8 and corresponding maneuverability motors (not shown) spaced about the body 104 of the UAV. The propellers 102 may be any form of propeller (e.g., graphite, carbon fiber) and of a size sufficient to lift and/or guide the UAV 100 and any payload engaged by the UAV 100 so that the UAV 100 can navigate through the air, for example, to deliver a payload to a location. In addition to the maneuverability propellers 102, the UAV 100 includes two lifting propellers 103-1, 103-2 and corresponding lifting motors (not shown). In this example, the lifting motors 103 are shown in a stacked configuration. Propeller 103-1 may rotate in a clockwise direction and propeller 103-2 may rotate in a counter-clockwise direction. The lifting motors and corresponding lifting propellers are of a size and configuration to provide additional lift and power efficiency to the UAV.

While this example includes eight maneuverability propellers and two lifting propellers, in other implementations, more or fewer maneuverability propellers and/or lifting propellers may be utilized. Likewise, in some implementations, the propellers may be positioned at different locations on the UAV 100. In addition, alternative methods of propulsion may be utilized for either or both of the lifting motors/propellers and/or maneuverability motors/propellers. For example, fans, jets, turbojets, turbo fans, jet engines, and the like may be used to propel the UAV.

The body 104 or housing of the UAV 100 may likewise be of any suitable material, such as graphite, carbon fiber and/or aluminum. In this example, the body 104 of the UAV 100 includes four rigid members 105-1, 105-2, 105-3, 105-4, or beams, also referred to herein as motor arms, arranged in a hash pattern with the rigid members intersecting and joined at approximately perpendicular angles. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some implementations, all of the rigid members 105 may be of approximately the same length while, in other implementations, some or all of the rigid members may be of different lengths. Likewise, the spacing between the two sets of rigid members may be approximately the same or different.

While the implementation illustrated in FIG. 1 includes four rigid members 105 that are joined to form the body 104 and corresponding motor arms, in other implementations, there may be fewer or more components to the body 104. For example, rather than four rigid members, in other implementations, the body 104 of the UAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the body 104. As discussed further below, a cavity within the body 104 may be configured to include a payload engagement mechanism for the engagement, transport and delivery of item(s) and/or containers that contain item(s) (generally referred to herein as a payload).

In some implementations, the UAV may be configured for aerodynamics. For example, an aerodynamic housing may be included on the UAV that encloses the UAV control system 110, one or more of the rigid members 105, the body 104 and/or other components of the UAV 100. The housing may be made of any suitable material(s) such as graphite, carbon fiber, aluminum, etc. Likewise, in some implementations, the location and/or the shape of the payload (e.g., item or container) may be aerodynamically designed. For example, in some implementations, the payload engagement mechanism may be configured such that, when the payload is engaged, it is enclosed within the body and/or housing of the UAV 100 so that no additional drag is created during transport of the payload by the UAV 100. In other implementations, the payload may be shaped to reduce drag and provide a more aerodynamic design of the UAV and the payload. For example, if the payload is a container and a portion of the container extends below the UAV when engaged, the exposed portion of the container may have a curved shape.

The maneuverability propellers 102 and corresponding propeller motors are positioned at both ends of each rigid member 105. The propeller maneuverability motors may be any form of motor capable of generating enough speed with the propellers to lift the UAV 100 and any engaged payload thereby enabling aerial transport of the payload. For example, the maneuverability motors may each be a FX-4006-13 740 kv multi rotor motor. Likewise, the maneuverability propellers may be of any material and size sufficient to provide lift and maneuverability to the UAV. For example, the maneuverability propellers may be 10 inch-12 inch diameter carbon fiber propellers.

The lifting propellers 103 and corresponding propeller motors are positioned toward a center of the body 104 of the UAV. The lifting motors may be any form of motor capable of generating enough speed with the lifting propellers 103 to lift the UAV 100 and any engaged payload thereby enabling aerial transport of the payload. For example, the propeller motors may each be a RC Tiger U11 124 KV motor. Likewise, the lifting propellers may be of any material and size sufficient to provide lift to the UAV. For example, the maneuverability propellers may be 29 inch-32 inch diameter carbon fiber propellers.

Mounted to the body 104 is the UAV control system 110. In this example, the UAV control system 110 is mounted to one side and on top of the body 104. The UAV control system 110, as discussed in further detail below with respect to FIG. 11, controls the operation, routing, navigation, communication, lifting motor control, maneuverability motor control, and the payload engagement mechanism of the UAV 100.

Likewise, the UAV 100 includes one or more power modules 112. In this example, the UAV 100 includes three power modules 112 that are removably mounted to the body 104. The power module for the UAV may be in the form of battery power, solar power, gas power, super capacitor, fuel cell, alternative power generation source, or a combination thereof. For example, the power modules 112 may each be a 6000 mAh lithium-ion polymer battery, or polymer lithium ion (Li-poly, Li-Pol, LiPo, LIP, PLI or Lip) battery. The power module(s) 112 are coupled to and provide power for the UAV control system 110, the propeller motors and the payload engagement mechanism.

In some implementations, one or more of the power modules may be configured such that it can be autonomously removed and/or replaced with another power module while the UAV is landed. For example, when the UAV lands at a delivery location, relay location and/or materials handling facility, the UAV may engage with a charging member at the location that will recharge the power module.

Figure 3:
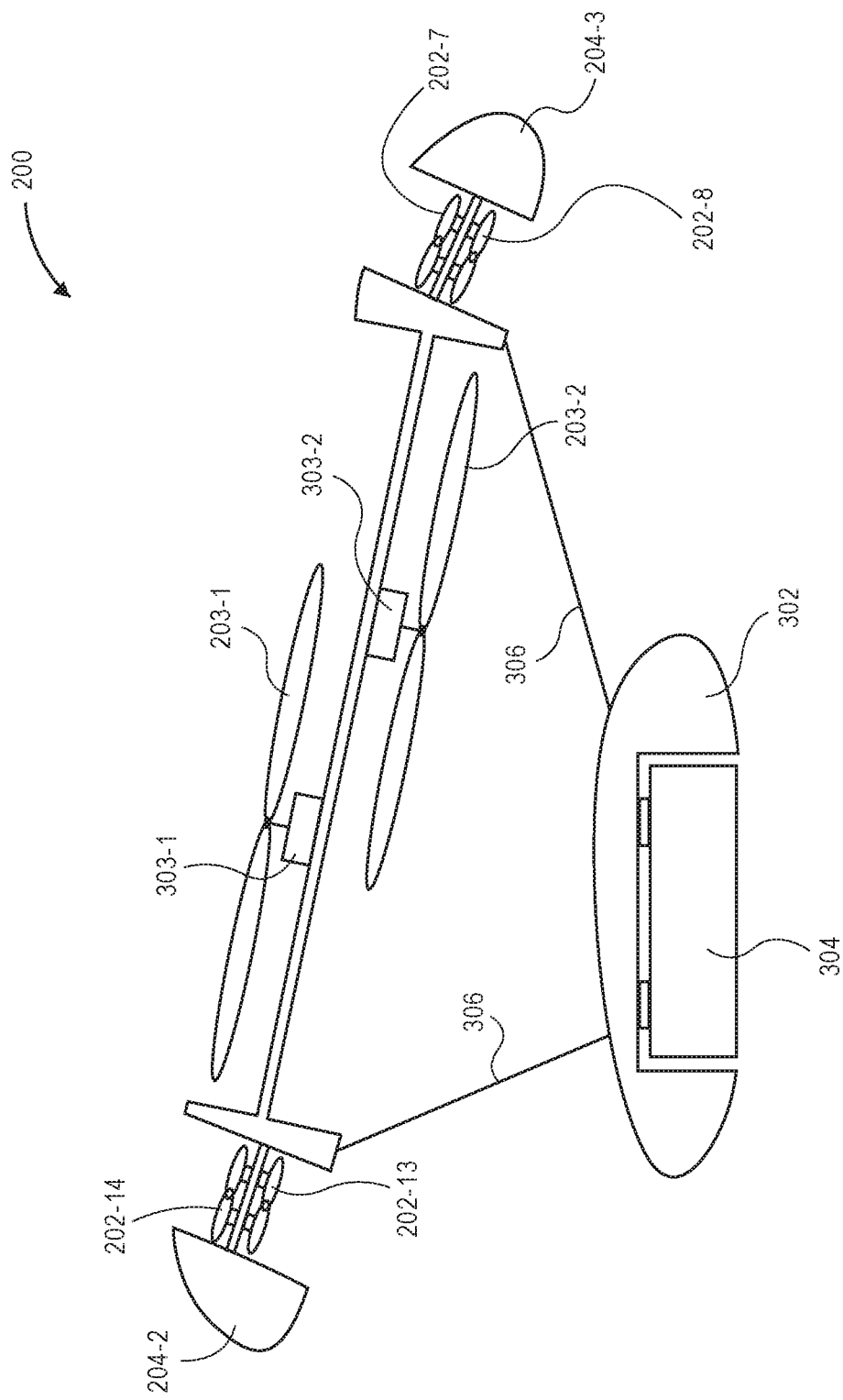
FIG. 3 depicts a partial side view of an unmanned aerial vehicle illustrated in FIGS. 2A-2C, according to an implementation.

As mentioned above, the UAV 100 may also include a payload engagement mechanism (not shown). The payload engagement mechanism may be configured to engage and disengage items and/or containers that hold items. In this example, the payload engagement mechanism is positioned beneath the body of the UAV 100. For example, as illustrated in FIG. 3, the payload engagement mechanism may be mounted beneath the body of the UAV 100 using a series of cables or connection points that provide enough separation between the lifting propeller(s) 103 and the payload engagement mechanism. The payload engagement mechanism may be of any size sufficient to securely engage and disengage containers that contain items. In other implementations, the payload engagement mechanism may operate as the container, containing the item(s). The payload engagement mechanism communicates with (via wired or wireless communication) and is controlled by the UAV control system 110.

While the implementations of the UAV 100 discussed herein utilize propellers to achieve and maintain flight, in other implementations, the UAV may be configured in other manners. For example, the UAV may include fixed wings and/or a combination of both propellers and fixed wings. For example, the UAV may utilize one or more propellers and motors to enable vertical takeoff and landing and a fixed wing configuration or a combination wing and propeller configuration to sustain flight while the UAV is airborne.

Figure 2A:
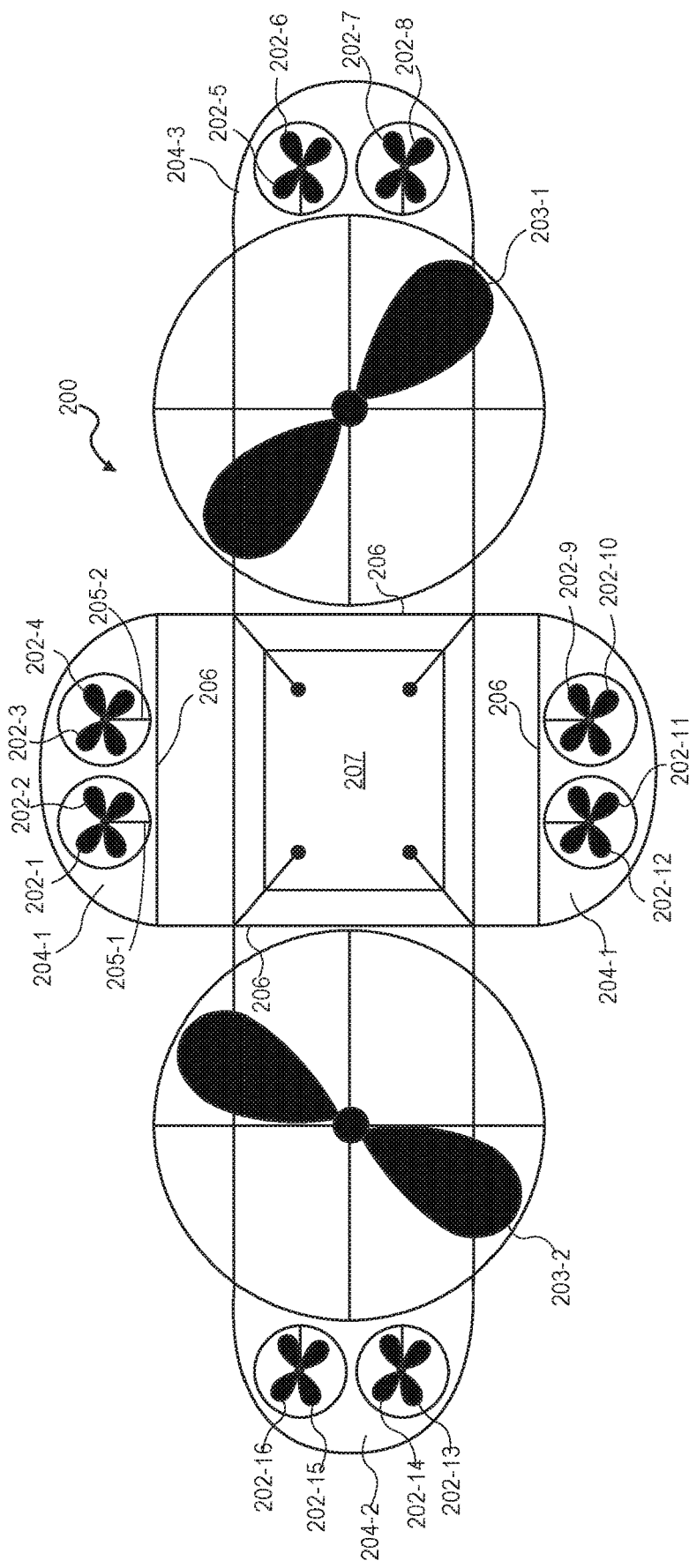
FIGS. 2A-2C depict block diagrams of a top-down view of an unmanned aerial vehicle in different configurations, according to an implementation.
Figure 2B:
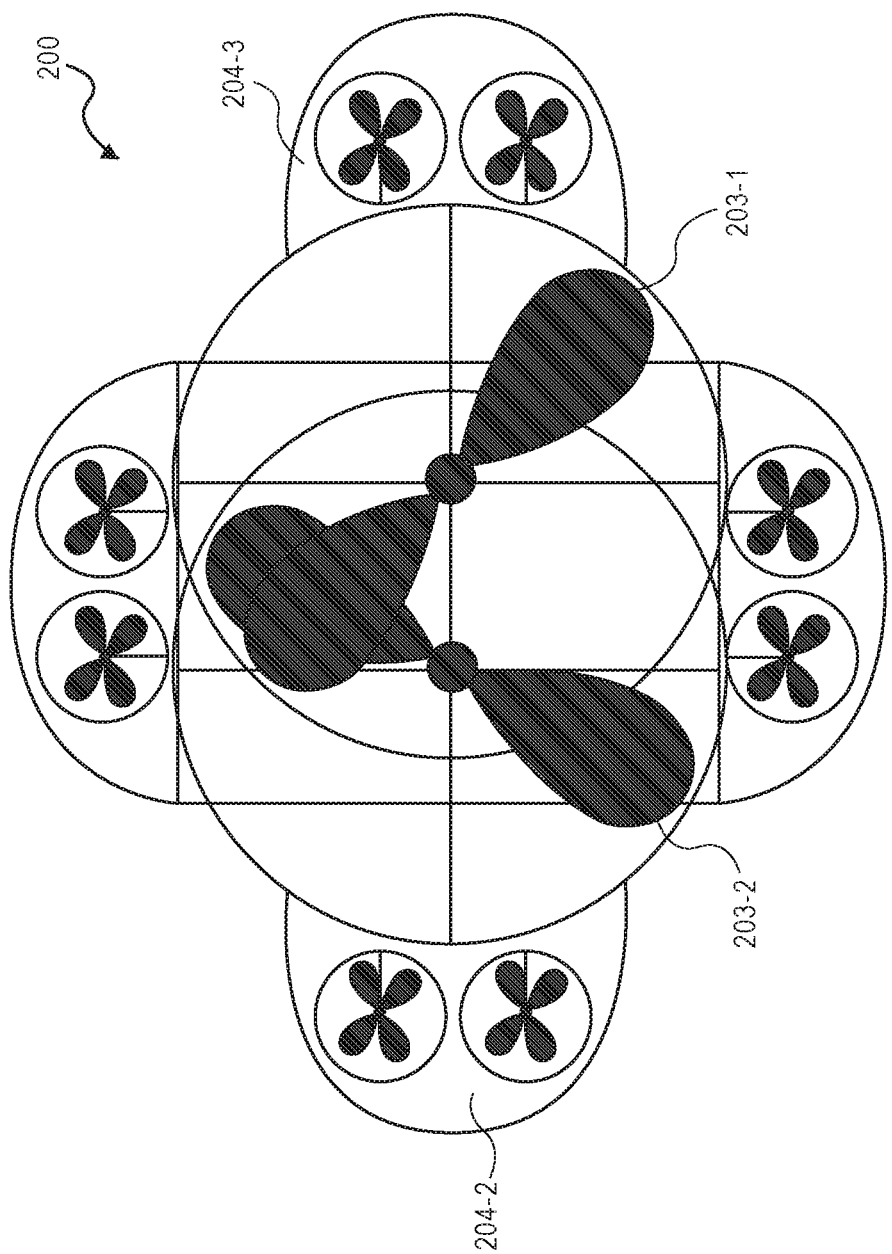
Figure 2C:
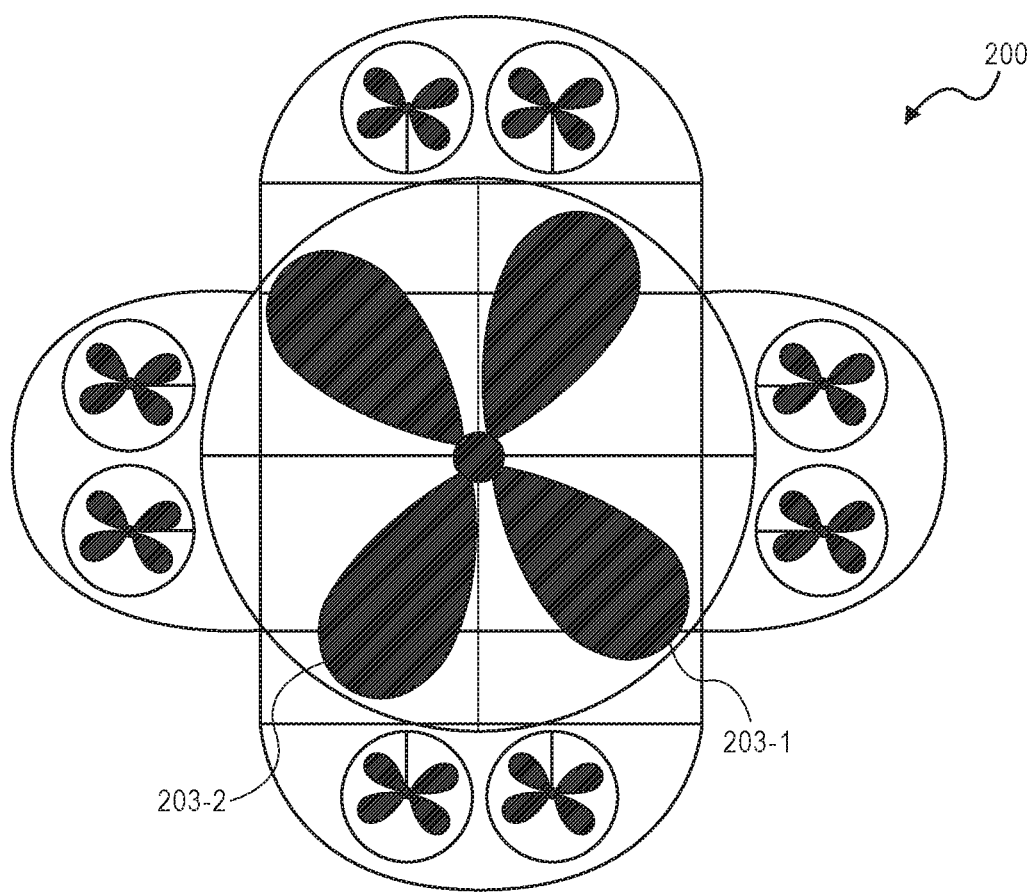

FIGS. 2A-2C depict block diagrams of a top-down view of a UAV 200 in different configurations, according to an implementation. Turning first to FIG. 2A, the UAV 200 is in an expanded configuration. As discussed in further detail below, the UAV control system may select one of several maneuverability profiles that specify a configuration for the UAV. A maneuverability profile may be determined and selected based at least in part on the position or location of the UAV. For example, the position of the UAV may include the altitude of the UAV, a velocity of the UAV, whether other objects are within a close proximity of and/or approaching the UAV, etc. Objects may be considered within a close proximity of a UAV if they are within a defined distance (e.g., 50 ft., 100 ft.) of the UAV.

The maneuverability profiles may include, but are not limited to, a high agility maneuverability profile or a high efficiency maneuverability profile. In the high agility maneuverability profile, the UAV may be configured for high agility. For example, it may be configured in a compact configuration with the lifting propeller(s) shut off so all flight and navigation is controlled by the maneuverability propellers. In comparison, in the high efficiency maneuverability profile, the UAV may be configured for increased power efficiency. For example, the UAV may be in an expanded configuration with the lifting propellers engaged. In such a configuration, the agility of the UAV may be decreased, but the power efficiency may be increased, thereby enabling longer flights.

When the UAV control system has selected a maneuverability profile that is designed for efficiency, the UAV may be configured in an expanded configuration, as illustrated in FIG. 2A. In this example, the UAV 200 includes two lifting propellers 203-1, 203-2 that are configured in a stacked configuration since lifting propeller 203-1 is above lifting propeller 203-2. Likewise, in some implementations, lifting propeller 203-1 may rotate in a first direction (e.g., clockwise) while lifting propeller 203-2 rotates in a second direction (e.g., counter-clockwise). In the expanded configuration illustrated in FIG. 2A, the lifting propellers 203-1 and 203-2 have been separated horizontally with respect to one another, thereby enlarging the overall size of the UAV 200 and reducing or eliminating any overlap of the lifting propellers 203-1, 203-2. By separating the lifting propellers 203-1 and 203-2 horizontally with respect to one another, the lifting capacity of the two propellers is increased and the overall power efficiency of the UAV 200 improves. For example, by separating the lifting propellers 203-1, 203-2 to reduce or eliminate the stacking or overlap of the propellers, the combined efficiency is improved because there is reduced or no air turbulence caused by the top propeller forcing air downward into the lower propeller. Likewise, as illustrated in FIG. 2A, when the UAV is expanded, the payload 207 may be retracted or pulled into the space between the lifting propellers 203-1, 203-2 and in-line with the body of the UAV, thereby making the UAV more aerodynamic.

In addition to lifting propellers 203-1, 203-2 and corresponding lifting motors, the UAV 200 includes several maneuverability propellers 202 and corresponding maneuverability motors (not shown). In this implementation, there are 16 maneuverability propellers 202-1, 202-2, 202-3, 202-4, 202-5, 202-6, 202-7, 202-8, 202-9, 202-10, 202-11, 202-12, 202-13, 202-14, 202-15, 202-16 arranged in stacked paired configurations. Similar to lifting propellers 203, the stacked pairs of maneuverability propellers 202, such as maneuverability propeller 202-1 and maneuverability propeller 202-2 may be stacked vertically with respect to one another and one of the propellers may rotate in a first direction (e.g., clockwise), while the other propeller rotates in a second, opposite direction (e.g., counter-clockwise). The maneuverability propellers 202 may be rotated by corresponding maneuverability motors (not shown) that are mounted onto a motor arm 205 that is coupled to the body 204 of the UAV. In some implementations, the motor arm 205 may be fixedly mounted to the body 204 of the UAV 200. However, in other implementations, the motor arm 205 may be rotatably mounted to the body 204 of the UAV, thereby enabling axial rotation of the motor arm and corresponding rotation of the mounted maneuverability motors and maneuverability propellers 202. For example, motor arms 205-1, 205-2 may be rotationally mounted to the fixed body portion 204-1 of the UAV 200. Rotating the axial position of the maneuverability motors and corresponding maneuverability propellers 202 with respect to the body 204 increases the agility and maneuverability of the UAV 200 by altering the direction of the thrust factor generated by the maneuverability motors and corresponding maneuverability propellers.

In other implementations, there may be additional or fewer maneuverability propellers. For example, in some implementations, the maneuverability propellers 202 may not be stacked in pairs and there may be eight maneuverability propellers. In other implementations, there may only be four maneuverability propellers, one at each of the body portions 204-1, 204-2, 204-3, 204-4.

In some implementations, to improve the stability of the UAV, all or some of the maneuverability motors and corresponding maneuverability propellers 202 and/or the lifting motors and lifting propellers 203 may be rotated inward toward a center of the UAV 200. For example, each of the maneuverability motors and corresponding maneuverability propellers may be rotated inward between approximately 1 degree and approximately 45 degrees. The amount of rotation of each maneuverability motor and corresponding maneuverability propeller 202 may be the same or different and may depend on other external forces (e.g., wind). Likewise, if the UAV 200 is in an expanded configuration and the lifting motors and corresponding lifting propellers 203 are not in a center of the UAV, the lifting motors and corresponding lifting propellers 203 may also be rotated inward toward a center of the UAV 200.

Rotating the motors and corresponding propellers of a UAV 200 inward, improves the overall stability of the UAV. This may be beneficial during high wind, turbulence, etc., so that the UAV maintains flight and operability. In some instances, such as high wind, it may be beneficial to have the UAV maintain a loiter position and rotate all of the maneuverability motors and corresponding maneuverability propellers 202 inward so that the UAV can withstand the forces from the high winds.

Rotating the maneuverability motors and corresponding maneuverability propellers and/or rotating the lifting motors and corresponding lifting propellers may be performed when the UAV is any configuration (expanded, contracted, transition).

The body 204 may include both fixed portion(s) that house one or more of the maneuverability motors and corresponding maneuverability propellers and one or more adjustable body portions. For example, the body 204 of the UAV 200 illustrated in FIG. 2A includes a fixed body portion 204-1 that includes four stacked pairs of maneuverability propellers 202-1, 202-2, 202-3, 202-4, 202-9, 202-10, 202-11, 202-12 and corresponding maneuverability motors (not shown). The fixed body portion 204-1 of the UAV 200 may include a series of rigid members or rails 206 that allow expansion and contraction of the two moveable body portions 204-2, 204-3. In this example, the two moveable body portions 204-2, 204-3 each include a lifting propeller 203 and corresponding lifting motor (not shown) and two sets of stacked maneuverability propellers 202. Specifically, in this example, the moveable body portion 204-2 includes lifting propeller 203-2 and corresponding lifting motor, and maneuverability propellers 202-13, 202-14, 202-15, 202-16. Moveable body portion 204-3 includes lifting propeller 203-1 and maneuverability propellers 202-5, 202-6, 202-7, 202-8. As the UAV 200 changes configurations, the moveable body portions 204 may be expanded or contracted along the rails 206 to alter the efficiency and/or agility of the UAV 200.

For example, turning now to FIG. 2B, the UAV 200 is illustrated in a transition mode where the moveable body portions 204-2 and 204-3 have begun to contract towards a center of the body 204 of the UAV 200, thereby bringing the center points of the lifting propellers 203-1, 203-2 closer together. As the configuration of the UAV 200 changes from the expanded configuration illustrated in FIG. 2A to the transition configuration illustrated in FIG. 2B, the overall power efficiency of the UAV may decrease but the agility and maneuverability of the UAV will increase due to the reduced size of the UAV 200. Likewise, if the UAV 200 is carrying a payload (not shown in FIG. 2B), the payload may lower from being in-line with the body 204 of the UAV 200 as the UAV 200 contracts. Lowering of the payload during transition is discussed further below with respect to FIG. 3.

Turning now to FIG. 2C, illustrated is a top-down view of the UAV 200 in a contracted configuration. In the contracted configuration, the two lifting propellers 203-1, 203-2 are stacked approximately over one another, thereby reducing the overall size or footprint of the UAV 200. In the contracted configuration illustrated in FIG. 2C, the agility and maneuverability of the UAV 200 is maximized, enabling the UAV 200 to operate in confined spaces and quickly move to avoid objects.

Turning now to FIG. 3, illustrated is a partial side view of the UAV 200 in a transition configuration, such as that illustrated above with respect to FIG. 2B. Illustrated are the lifting propellers 203-1, 203-2, corresponding lifting motors 303-1, 303-2, along with the moveable body portions 204-2, 204-3 and corresponding maneuverability propellers 202-13, 202-14, 202-7, 202-8.

As shown, the lifting propellers 203-1, 203-2 and corresponding lifting motors 303-1, 303-2 are separated horizontally with respect to one another, thereby expanding the overall size or footprint of the UAV 200. As the lifting propellers 203-1, 203-2 separate into an expanded configuration, the moveable body portions 204-2, 204-3 separate in distance. Similarly, as the lifting propellers 203-1, 203-2 contract into a contracted configuration, the moveable body portions 204-2, 204-3 become closer to one another in distance.

In some implementations, as illustrated, the moveable body portions 204 may have different shapes to improve the efficiency of directional flight. For example, moveable body portion 204-3 may have a forward facing portion that is aerodynamically designed for efficient travel in a forward direction. Likewise, the moveable body portion 204-2 may have an aerodynamic design that is configured for efficient travel in a trailing direction.

Also illustrated in FIG. 3 is a payload engagement mechanism 302 holding a payload 304. In this example, the payload engagement mechanism is connected to the UAV through a series of cables 306. The cables 306 may be connected to the payload engagement mechanism 302 and affixed to different portions of the UAV 200, such as the moveable body portions 204-2, 204-3. In such an implementation, as the UAV expands in configuration, the payload engagement mechanism 302 will be drawn closer to the UAV as the cables connected to the moveable body portions 204-2 and 204-3 extend away from one another. Drawing the payload engagement mechanism 302 up towards the UAV further improves aerodynamics and efficiency of flight. Likewise, as the UAV 200 transitions to a contracted configuration with the lifting propellers 203-1, 203-2 aligned in a stacked configuration, the payload engagement mechanism 302 will be separated farther from the UAV 200, thereby improving the ability for the payload 304 to be engaged or disengaged at or near a defined location.

In other implementations, the payload engagement mechanism 302 may be coupled to the UAV 200 using techniques other than cables. For example, the payload engagement mechanism 302 may be rigidly mounted to a portion of the UAV, may be connected to the UAV by one or more pulleys that can extend or retract the payload engagement mechanism 302, etc.

While the examples illustrated in FIGS. 2A-3 show a UAV 200 with two lifting propellers and sixteen maneuverability propellers and a payload engagement mechanism connected to the UAV 200 via a series of cables 306, it will be appreciated that other implementations and configurations are likewise available. For example, the UAV 200 may have fewer or additional lifting propellers and corresponding lifting motors and/or fewer or additional maneuverability propellers and/or lifting motors. Likewise, the payload engagement mechanism may be coupled with the UAV 200 via different mechanisms and/or fixedly attached to one or more portions of the UAV 200. Likewise, rather than having the lifting propellers 203 aligned in a central portion of the UAV 200 and the maneuverability propellers 202 aligned along a perimeter portion of UAV 200, other configurations may be envisioned.

Figure 4B:
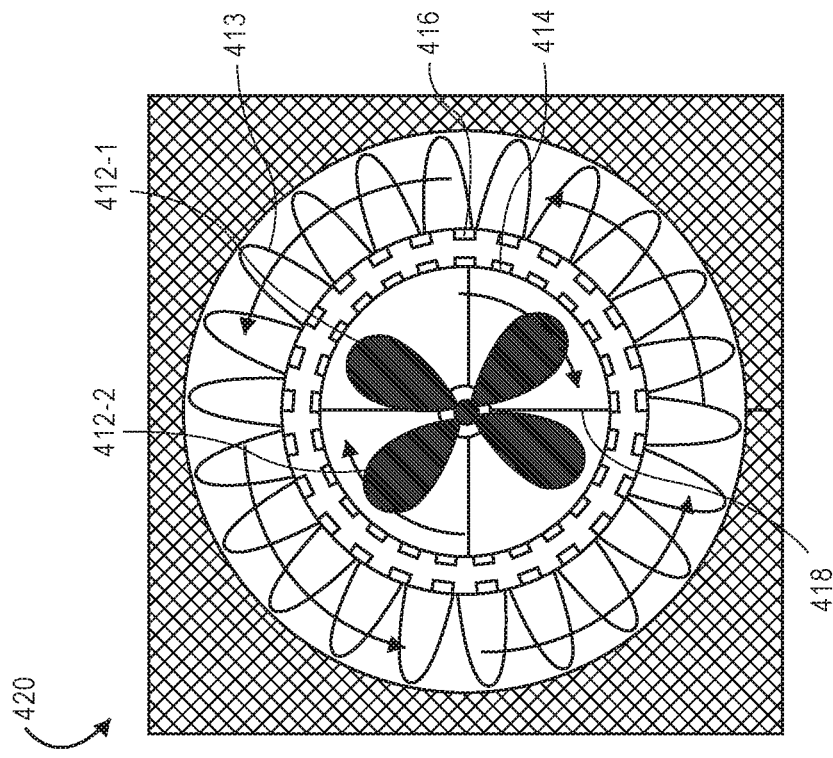
FIGS. 4A-4B depict block diagrams of propeller assemblies, according to an implementation.
Figure 4A:
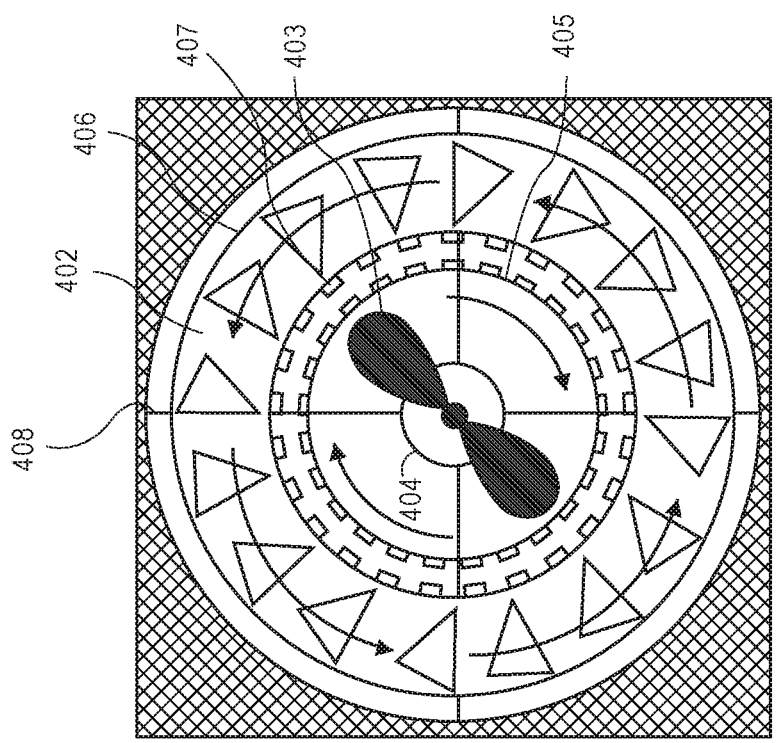

FIGS. 4A and 4B, illustrate top-down views of combined propeller configurations, according to an implementation. In the example illustrated in FIG. 4A, a first propeller 403 may be centrally mounted to a motor 404, such as an outrunner brushless motor and may rotate in a first direction, such as clockwise. The first propeller 403 may be any type of propeller used with UAVs, such as the ones described herein. In comparison, the second propeller 402, which surrounds the first propeller 403, may be a series of annular blades mounted to a rotating member 406. The second propeller, which includes the annular rotating member 406, may rotate in a direction opposite to the first propeller 403, such as counter-clockwise.

In one implementation, the motor for the second propeller 402 may be an outrunner brushless motor in which the stator 405 of the outrunner brushless motor encases and surrounds the first propeller 403. Likewise, the rotor 407 of the outrunner brushless motor encases and surrounds the stator 405 so that when energized the rotor 407 of the outrunner brushless motor rotates around the stator 405. The annular rotating member 406 may be mounted to and rotate with the rotor 407.

In one implementation, the blades of the first propeller 403 and the annular blades of the second propeller 402, while rotating in opposite directions, may be configured to both provide lift in the same direction. Because the blades of the second propeller 402 do not overlap with the blades of the first propeller 403, there is no annular momentum or turbulence typically caused by overlapping propeller blades. In addition, in some implementations, one or both of the first propeller 403, the second propeller 402, the blades of the first propeller 403 and/or the blades of the second propeller 402 may be adjusted about one or more axes 408 to improve agility and/or maneuverability of the UAV 200. Likewise, in some implementations, the individual annular blades of the second propeller 402 and/or the blades of the first propeller 403 may be configured to change pitch, thereby adjusting the thrust and/or rotational force of the second propeller 402 and/or the first propeller 403.

The first propeller 403 and/or the second propeller 402 may be configured as lifting propellers or maneuverability propellers, as discussed herein. In one implementation, both the first propeller 403 and the second propeller 402 may be configured as lifting propellers positioned toward the center of the UAV 200 and the UAV 200 may include additional maneuverability propellers. In other implementations, the first propeller 403 may be configured as a maneuverability propeller and the second propeller 402 may be configured as a lifting propeller. In still another implementation, the first propeller 403 may be configured as a lifting propeller and the second propeller 402 may be configured as a maneuverability propeller.

FIG. 4B is another block diagram of a propeller assembly 420, according to an implementation. In this example, the propeller assembly 420 includes two internal propellers 412-1, 412-2 that may be arranged in a stacked configuration and rotate in opposite directions. Similar to the other examples, the internal propellers 412-1, 412-2 may be rotated by any type of motor, such as an inrunner or outrunner brushless motor.

Surrounding the internal propellers 412-1, 412-2 is a third propeller configuration. The third propeller configuration may be designed using a larger outrunner brushless motor in which the stator 414 of the outrunner brushless motor encases and surrounds the two internal propellers 412-1, 412-2. Likewise, the rotor 416 of the outrunner brushless motor encases and surrounds the stator 414 so that when energized the rotor of the outrunner brushless motor rotates around the stator 414. Attached to the perimeter of the rotor 416 is a series of propeller blades 413 that are rotated with the rotor 416 as the rotor rotates. In some implementations, the third propeller configuration and the internal propeller(s) may be adjusted about one or more axes 418 to improve agility and/or maneuverability of the UAV 200. Likewise, in some implementations, the individual propeller blades 413 of the third propeller configuration, the blades of the first propeller 412-1 and/or the blades of the second propeller 412-2 may be configured to change pitch, thereby adjusting the thrust and/or rotational force of the third propeller configuration, first propeller 412-1 and/or second propeller 412-2.

Similar to the configuration discussed with respect to FIG. 4A, the propellers described with respect to FIG. 4B may be configured as lifting propellers and/or maneuverability propellers. For example, the first two propellers 412-1, 412-2 and/or the third propeller configuration may be configured as lifting propellers or maneuverability propellers, as discussed herein. In one implementation, the first propeller 412-1, second propeller 412-2 and the third propeller configuration may be configured to all function as lifting propellers and be positioned toward the center of the UAV 200. In other implementations, the first propeller 412-1 and the second propeller 412-2 may be configured as maneuverability propellers and the third propeller configuration may operate as a lifting propeller. In still another implementation, the first propeller 412-1 and the second propeller 412-2 may be configured as lifting propellers and the third propeller configuration may operate as a maneuverability propeller.

Figure 5:
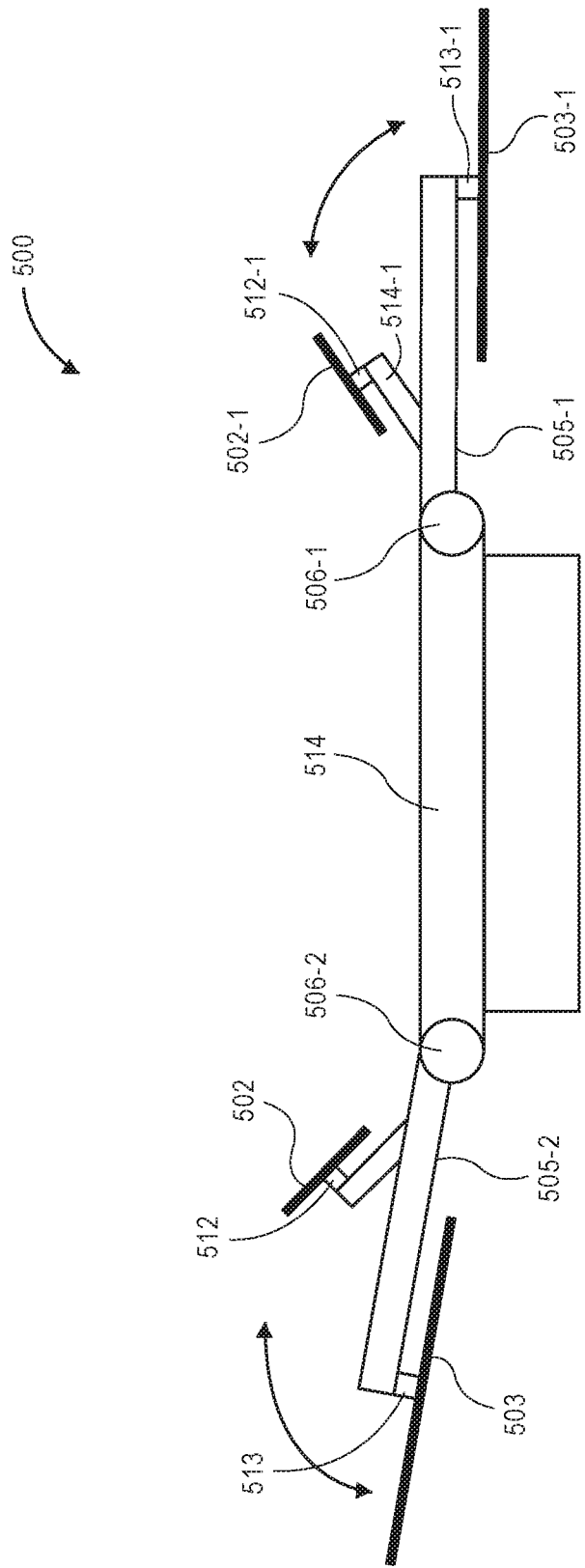
FIG. 5 depicts a block diagram of a side view of an unmanned aerial vehicle, according to an implementation.

FIG. 5 depicts a block diagram of a side view of a UAV 500, according to an implementation. The partial side view of the UAV 500 illustrates two motor arms 505-1, 505-2 coupled with a body 514 of the UAV 500. In this example, each motor arm 505-1, 505-2 includes a lifting propeller 503, corresponding lifting motor 513, maneuverability propeller 502 and corresponding maneuverability motor 512. The lifting propellers 503 are aligned with the motor arms 505 in a fixed position. However, the maneuverability propellers and corresponding maneuverability motors 512 are offset with respect to the motor arms 505. For example, the maneuverability propeller 502-1 and corresponding maneuverability motor 512-1 extend out of a secondary motor arm 514-1 that is at an angle with respect to the motor arm 505-1. The angle between the motor arm 505-1 and the secondary motor arm 514-1 may be any angle between zero and 90°. In comparison, the lifting propeller 503-1 and corresponding lifting motor 513-1 are aligned with the motor arm 505-1. In one implementation, the secondary motor arm 514 may be at approximately a 30° angle with respect to the motor arm 505.

The motor arms 505 are coupled to the body 514 of the UAV 500 at one or more rotating connection points 506. For example, motor arm 505-1 is coupled to the body 514 of the UAV 500 at a rotating connection point 506-1 and motor arm 505-2 is connected to the body 514 of the UAV 500 at rotating connection point 506-2. Each of the rotating connection points 506 may be configured to rotate or pivot the motor arms 505 with respect to the body 514 of the UAV in response to rotation controls from the UAV control system. By rotating a motor arm 505, the attached lifting propeller 503 and maneuverability propeller 502 are likewise rotated with respect to the body 514 of the UAV 500. In addition, by offsetting the maneuverability propeller 502 with respect to the motor arm 505 by a defined degree, when the motor arm 505 is rotated or pivoted about the rotating connection point 506, the angle of rotation of the maneuverability propeller 502 with respect to the body 514 of the UAV 500 is greater than the angle of rotation of the lifting propeller 503 with respect to the body 514 of the UAV 500. Accordingly, a greater degree of alternate thrust vectoring for maneuverability control can be achieved by slight rotations of the motor arms 505 without a great degree of rotation of the thrust vectoring from the lifting propeller 503.

Figure 6:
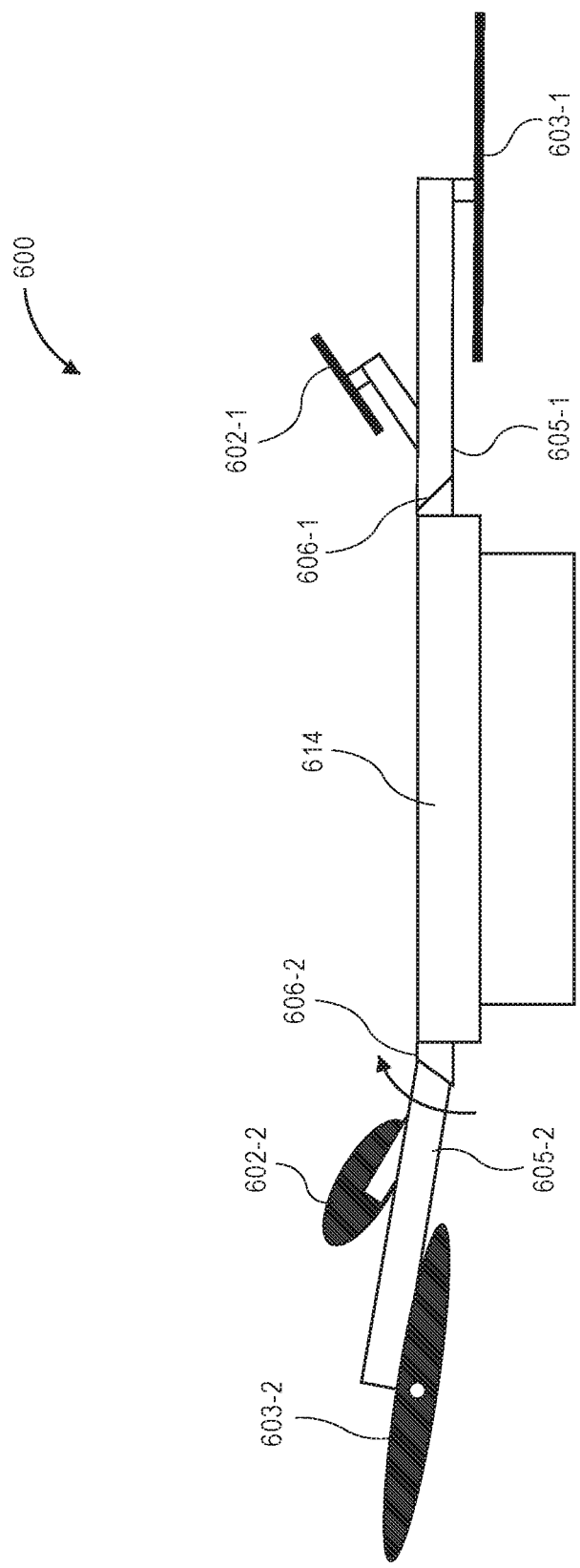
FIG. 6 depicts a block diagram of a side view of an unmanned aerial vehicle, according to an implementation.

FIG. 6 is another block diagram of a partial side view of a UAV 600, according to an implementation. Similar to FIG. 5, the UAV 600 illustrated in FIG. 6 includes a partial side view of the body 614 coupled to two motor arms 605-1, 605-2 that may be rotated or pivoted with respect to the body 614 using a rotating mechanism 606-1, 606-2. In comparison to FIG. 5, however, the rotating mechanism 606-1, 606-2 is configured to adjust the angle of the motor arm 605-2 with respect to the body 614 by rotating or turning the motor arm 605 about the rotating mechanism 606 rather than having the rotating mechanism causing the arm to pivot. As illustrated in FIG. 6, the rotating mechanism 606 is offset at an angle with respect to the body 614 and the motor arm 605 such that when the motor arm 605 is rotated it causes the motor arm to not only rotate about an axis but also alter its angle with respect to the body 614 of the UAV, as illustrated by the rotation of motor arm 605-2. As illustrated, not only does the angle of the motor arm 605 change with respect to the body 614 of the UAV 600 thereby causing the angle of the lifting propeller 603 and the angle of the maneuverability propeller 602 to alter with respect to the body 614 of the UAV 600, but also the orientation of the motor arm 605 is altered with respect to the body 614 of UAV 600. Similar to altering the angle of the lifting propeller 603 and the maneuverability propeller 602, the orientation of the lifting propeller 603 and the maneuverability propeller 602 is also altered along with the altered orientation of the motor arm 605. As illustrated in FIG. 6, the motor arm 605-2 has been rotated in one direction thereby causing the maneuverability propeller 602-2 to re-orient and change its angle with respect to the body 614 of the UAV 600 and the lifting propeller 603-2 has also re-oriented and changed its angle with respect to the body 614 of the UAV 600.

Figure 7:
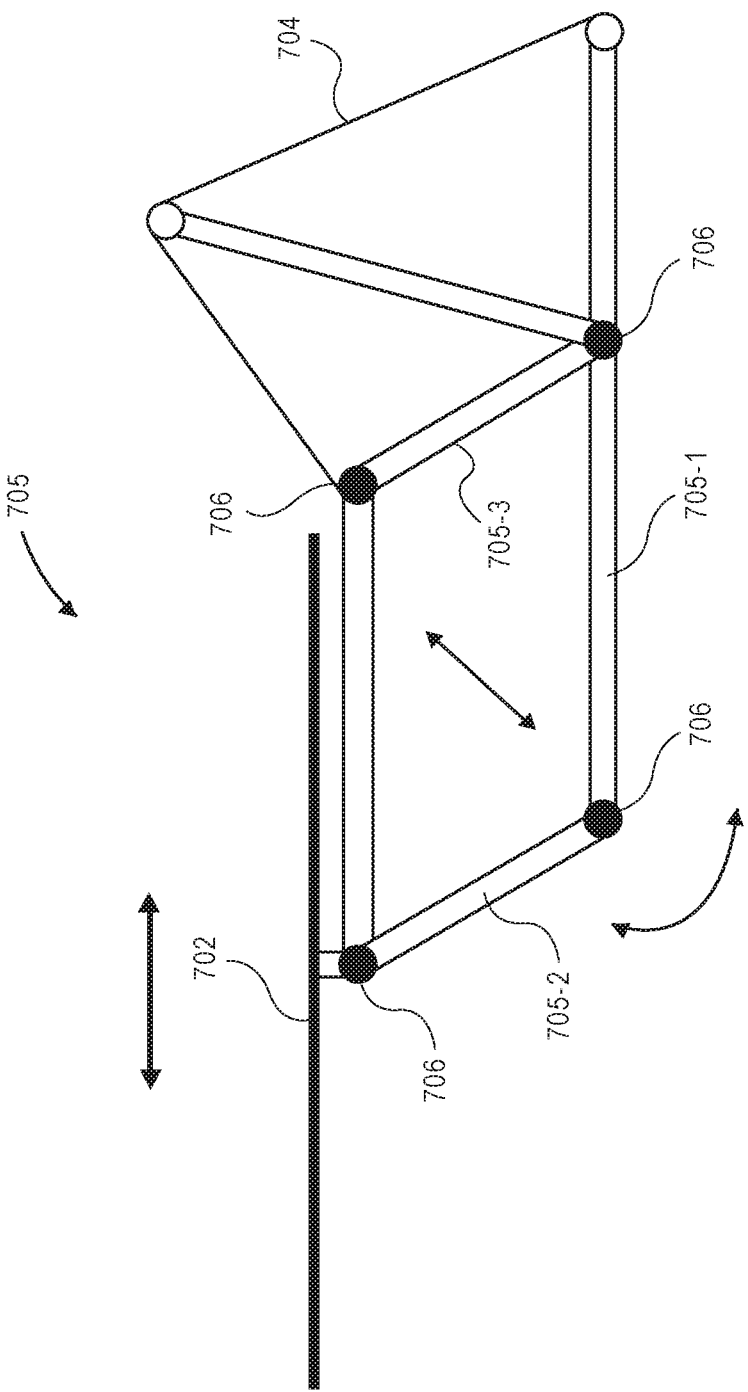
FIG. 7 depicts a block diagram of a side view of an unmanned aerial vehicle motor arm, according to an implementation.

FIG. 7 is a block diagram of a side view of a motor arm 705, according to an implementation. The example motor arm 705 illustrated in FIG. 7 illustrates an ability for expanding or contracting the motor arm through use of one or more pulleys 704. In this example, the motor arm may include a fixed or rigid member 705-1 with several pivot points 706. Each pivot point 706 may include another suspension arm 705-2, 705-3 that establish a body upon which the propeller 702 and corresponding motor may be mounted. When the pulley 704 is contracted, the suspension arms 705-2, 705-3 pivot about pivot points 706 toward a more vertical direction thereby causing the propeller 702 to move inward towards the body of the UAV (to the right of FIG. 7 but not shown). In comparison, when the pulley 704 is extended, the suspension arms 705-2, 705-3 pivot about pivot points 706 in a more horizontal direction thereby extending the propeller 702 away from the body of the UAV. Through use of rigid member 705-1, a pulley 704, and one or more suspension arms 705-2, 705-3, any number of positions of contraction or extension of the propeller 702 with respect to the body of the UAV may be established by expanding or contracting the pulley 704. Likewise, in any position, the propeller 702 will remain aligned with the body of the UAV.

Figure 8:
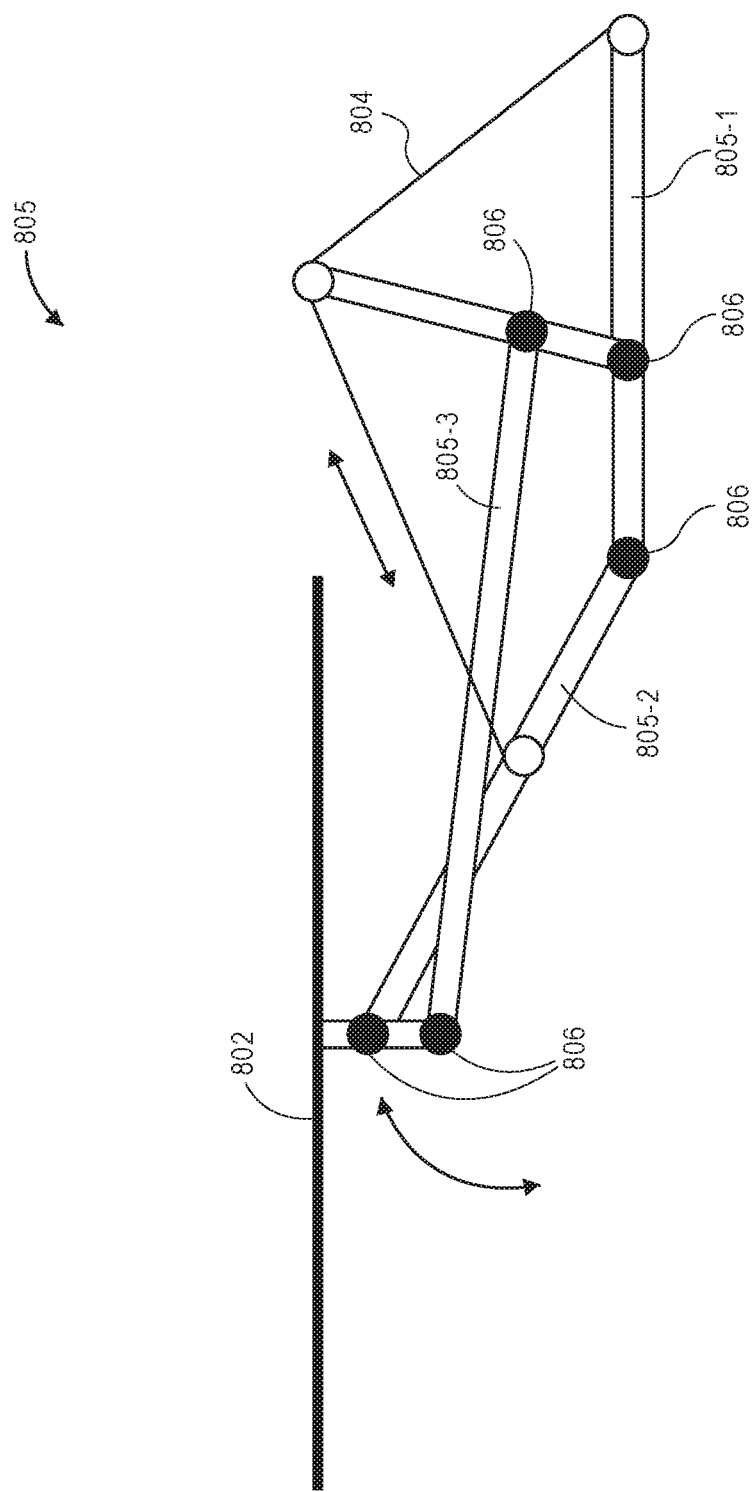
FIG. 8 depicts a block diagram of a side view of an unmanned aerial vehicle motor arm, according to an implementation.

FIG. 8 is a block diagram of another side view of a motor arm 805, according to an implementation. The motor arm 805 in this example utilizes a pulley 804 and a series of pivot points to expand or contract a position of a propeller 802 with respect to a body of a UAV (to the right of FIG. 8 but not shown). For example, when the pulley 804 is contracted, the suspension arms 805-2, 805-3 are moved in a more vertical direction with respect to the rigid member 805-1, thereby causing the propeller 802 to pivot about pivot points 806 up and toward the body of the UAV into a contracted position. In comparison, when the pulley 804 is extended, the suspension arms 805-2, 805-3 move in a more horizontal direction, thereby extending the propeller 802 around pivot points 806, down and away from the body of a UAV.

Figure 9B:
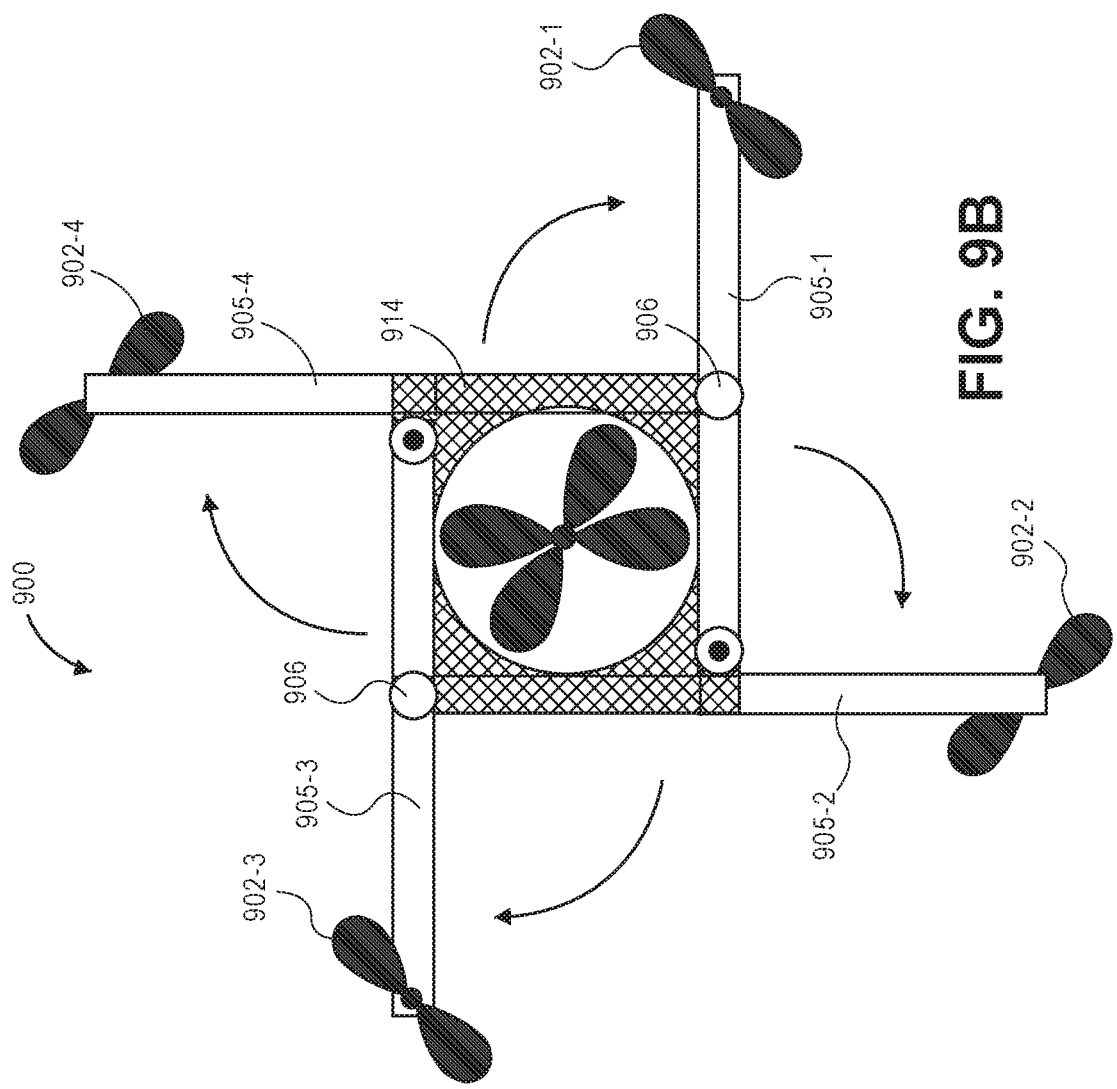
FIGS. 9A-9D depict block diagrams of a top-down view of an unmanned aerial vehicle in different configurations, according to an implementation.
Figure 9A:
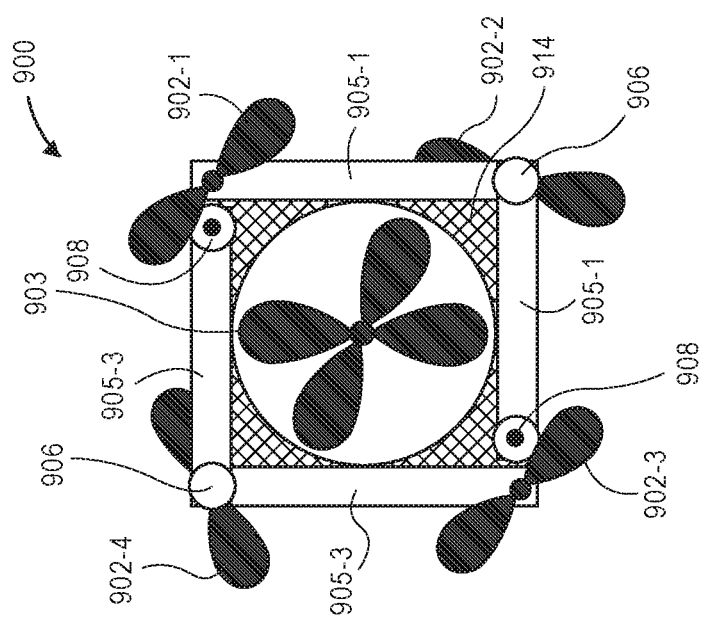

FIGS. 9A-9D are top-down views of a block diagram of a configurable UAV 900, according to an implementation. Turning first to FIG. 9A, the UAV 900 is illustrated in a contracted configuration. In the contracted configuration, the motor arms 905 are contracted and positioned on, above, or below the body 914 of the UAV 900. For example, motor arms 905-1 and 905-3 and attached propellers 902-1, 902-3 are mounted to a top of the body 914 and are positioned along a top perimeter of the body 914 of the UAV. Likewise, the motor arms for motor propellers 902-2 and 902-4 are mounted to an underside of the body 914 and positioned along an underside perimeter of the body 914 of the UAV 900. As can be seen, the propellers 902-1, 902-3 mounted to motor arms 905-1, 905-3 are on top and positioned above the body 914 of the UAV 900, while the propellers 902-2, 902-4 are mounted to motor arms that are connected to an underside of the body 914 of the UAV. Likewise, as illustrated in other figures, one or more lifting propellers 903 and motors may be positioned within the body 914 to provide additional lift capacity and power efficiency for the UAV 900.

Each of the motor arms 905 may include one or more pivot points 906 about which the motor arms may be extended or contracted by rotating the motor arms and/or the body 914 of the UAV 900, thereby causing the motor arms to extend or contract by rotating about the pivot point 906. Likewise, each of the motor arms 905 may be coupled to the body 914 of the UAV 900 at one or more pivot points 908. The motor arms may be held in position at each of the pivot points 906, 908 by one or more engagement members such as a bar, clutch or braking mechanism that holds the arm in a fixed position. When the motor arm is to be extended or contracted, the engagement member at the pivot points 906, 908 may be retracted or otherwise removed allowing pivoting or movement of the motor arm about the respective pivot point. In some implementations, one or more of the pivot points of a motor arm 905 may be engaged or disengaged selectively by the UAV control system.

In one implementation, a respective motor arm 905 may be extended or contracted by disengaging one or more of the pivot points 906, 908 and rotating the body 914 of the UAV 900 in a direction at a sufficient velocity to cause the motor arm to pivot due to centrifugal forces pulling or pushing on the motor arm.

For example, turning to FIG. 9B, the UAV 900 is illustrated in a transition configuration in which each of the motor arms 905 are partially extended from the body 914. In this example, to cause the motor arms 905 to partially extend as illustrated in FIG. 9B, the engagement mechanisms at pivot points 906 have been disengaged and the body 914 of the UAV has been rotated in a counter-clockwise direction at a sufficient velocity to cause the motor arms 905 to pivot about the pivot points 906. As each of the motor arms 905-1, 905-2, 905-3, 905-4 reach a desired position with respect to the body 914 of the UAV 900, the engagement members of the pivot points 906 may be re-engaged, thereby locking the motor arms into place. In this example, the motor arms are rotated to cause the extended portions of the motor arms to be in a collinear position with the remainder of the motor arm approximately perpendicular to an adjacent side of the UAV 900. As will be appreciated, by disengaging the engagement member at one or more of the pivot points 906 and rotating the UAV in a respective direction, the amount of extension or rotation of the motor arms about the pivot point 906 may be set to any position desired by the UAV control system. When the motor arm 905 reaches the desired position, the engagement member may be re-engaged, thereby locking the motor arm into place.

By extending a portion of the motor arms 905-1, 905-2, 905-3, 905-4, the attached propellers 902-1, 902-2, 902-3, 902-4 are extended away from the body 914 of the UAV 900.

Figure 9C:
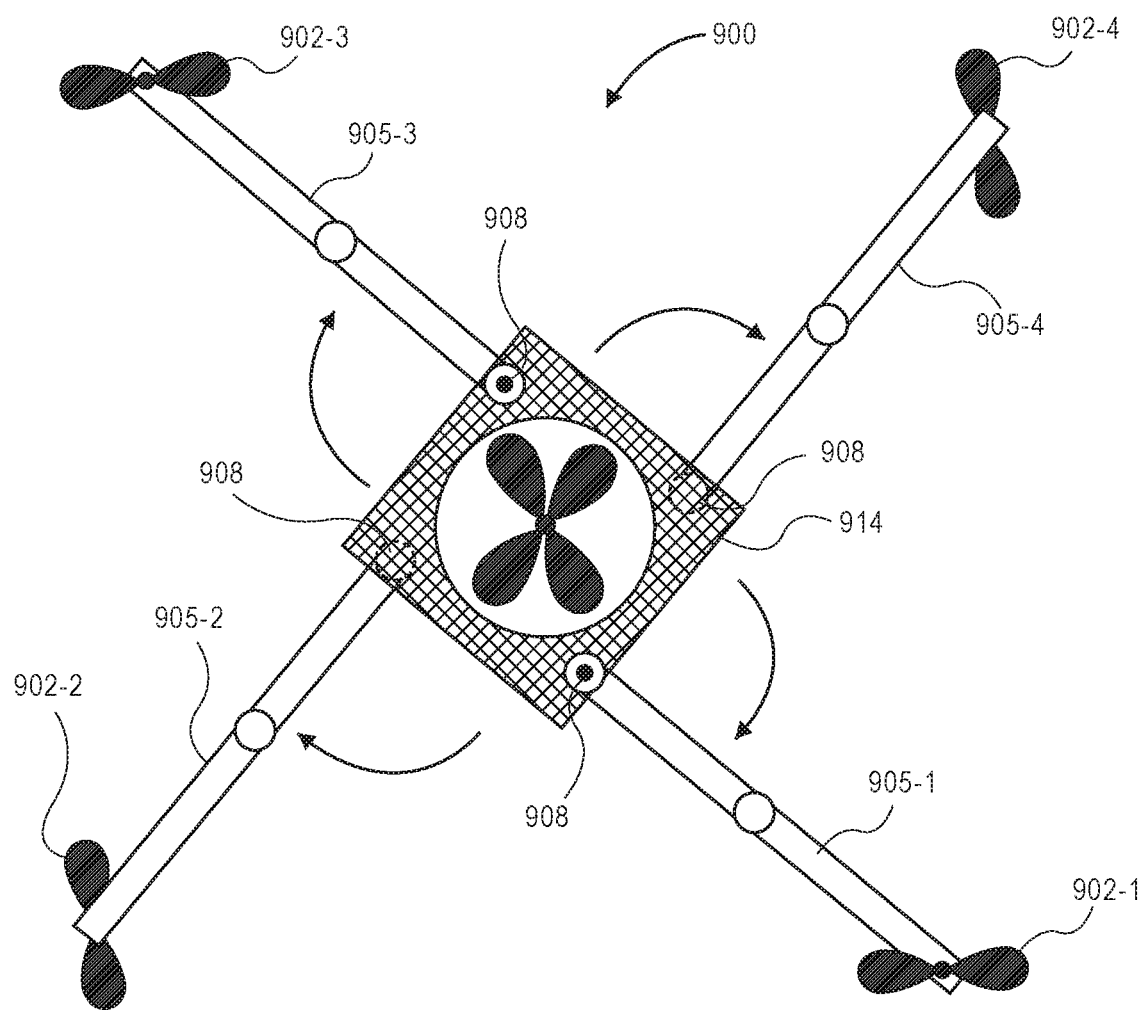

Turning now to FIG. 9C, illustrated is a top-down view of a UAV 900 in an extended configuration. Similar to transitioning between the contracted configuration and the transition configuration, to move the UAV to the extended configuration, the engagement members at the pivot points 908 between the body 914 of the UAV 900 and each of the motor arms 905-1, 905-2, 905-3, 905-4 are disengaged as the UAV rotates in one direction, thereby causing the motor arms 905 to extend outward away from the body 914 of the UAV due to centrifugal force caused by the rotation of the UAV 900. As each of the motor arms 905 reach their desired position with respect to the body 914 of the UAV 900, the UAV control system re-engages the engagement members at each of the pivot points 908, thereby locking the motor arms 905 into a desired position. With the UAV 900 in a fully extended configuration, the propellers 902-1, 902-2, 902-3, 902-4 are extended away from the body 914 of the UAV, thereby improving the power efficiency of the UAV 900.

While the example described above illustrates the transition from a contracted position (FIG. 9A) to a transition position (FIG. 9B) to an extended position (FIG. 9C) of the UAV 900, it will be appreciated that movement between any of the positions may be performed with the UAV 900. For example, the UAV may move from an extended position to a contracted position by disengaging the engagement members at the pivot points 906, 908 and rotating the body 914 of UAV 900 in another direction, thereby causing the motor arms to collapse around the UAV due to the centrifugal force caused by the rotation of the UAV 900. Likewise, a UAV 900 may move from a transition configuration to a contracted configuration by disengaging the engagement members at the pivot points 906 and rotating the body of the UAV 900, thereby causing the extended portion of the motor arms 905 to collapse around the body 914 of the UAV 900 and then locking the engagement members back into place to secure the position of the motor arms in the collapsed configuration. Likewise, while the examples described above discuss an engagement member positioned at the pivot points 906, 908, the engagement members may be positioned at any point between the body 914 and any portion of the motor arms 905.

Figure 9D:
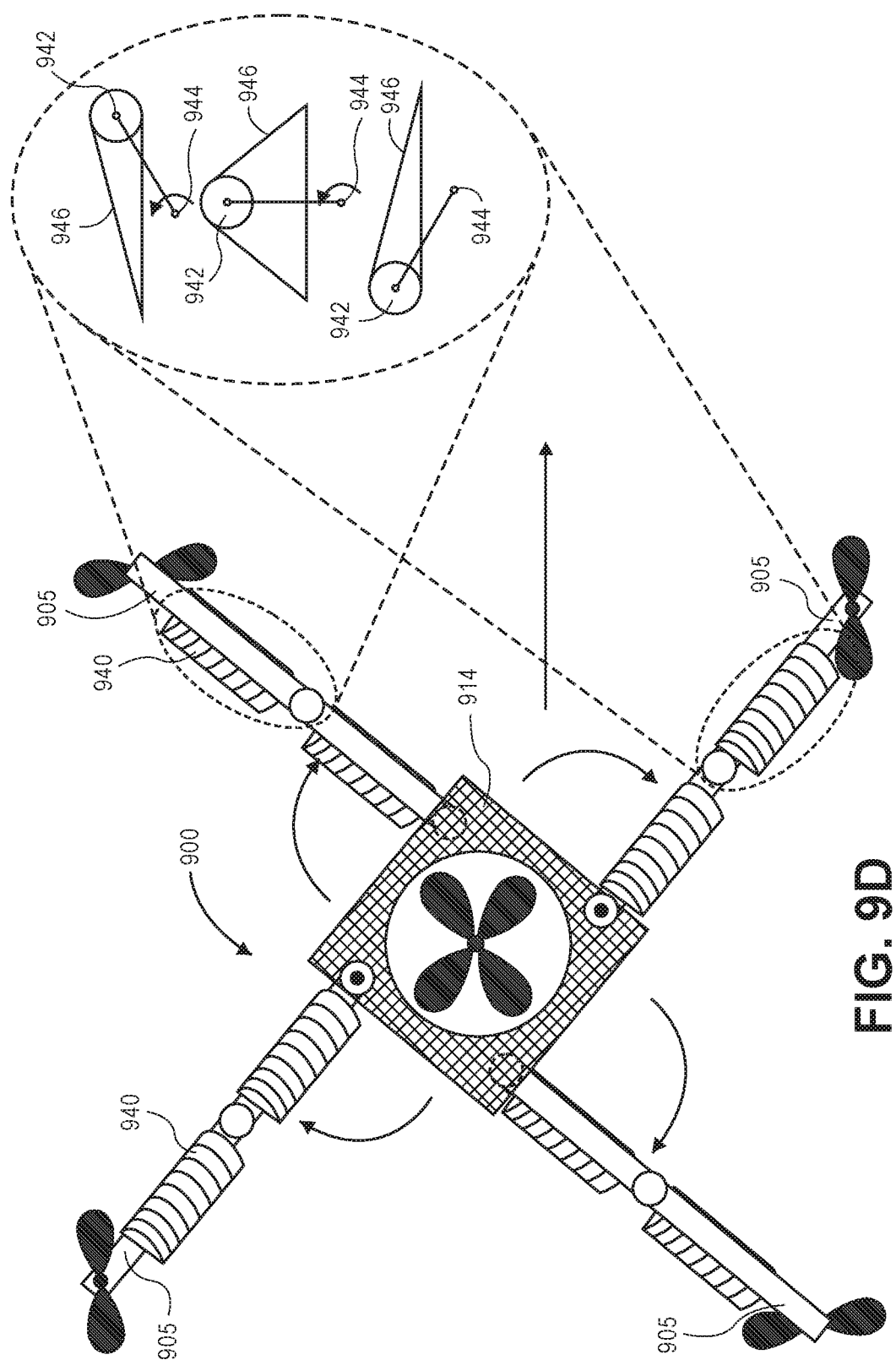

Turning now to FIG. 9D, shown is another implementation of a UAV 900 that includes one or more rotating motor arms 905. In this implementation, each of the motor arms 905 includes one or more dynamically adjustable aerodynamic elements 940. The dynamically adjustable aerodynamic elements 940 provide aerodynamic airflow and directionality to the UAV 900 as the UAV is in flight. For example, the dynamically adjustable aerodynamic elements 940 may be configured to position themselves in a convex shape (e.g., an airfoil shape) similar to an airplane wing, thereby providing additional lift and therefore power efficiency to the UAV 900 as the UAV 900 moves in a particular direction. In one implementation, the dynamically adjustable aerodynamic elements 940 may be mounted to each section of a motor arm 905 at one or more pivot points 944. At each pivot point 944, the UAV control system may cause pivoting of the positioning element 942 to rotate about a flexible membrane 946. For example, if the UAV 900 is moving in an eastward direction, as illustrated in FIG. 9D, the positioning element 942 may be rotated about a pivot point 944 by the UAV control system such that it is in a forward direction of travel such that the dynamically adjustable aerodynamic element 940 is larger at a front end than at a back end, thereby causing a lift from air passing over the flexible membrane 946. In one implementation, a servo motor or actuator may be controlled by the UAV control system and configured to position and move the positioning element 942 of the dynamically adjustable aerodynamic element 940.

In some implementations, the adjustable aerodynamic element 940 may be mounted to a top or bottom side of the respective motor arms 905, so that the motor arms can be extended and/or collapsed about the body 914 of the UAV 900.

Figure 10:
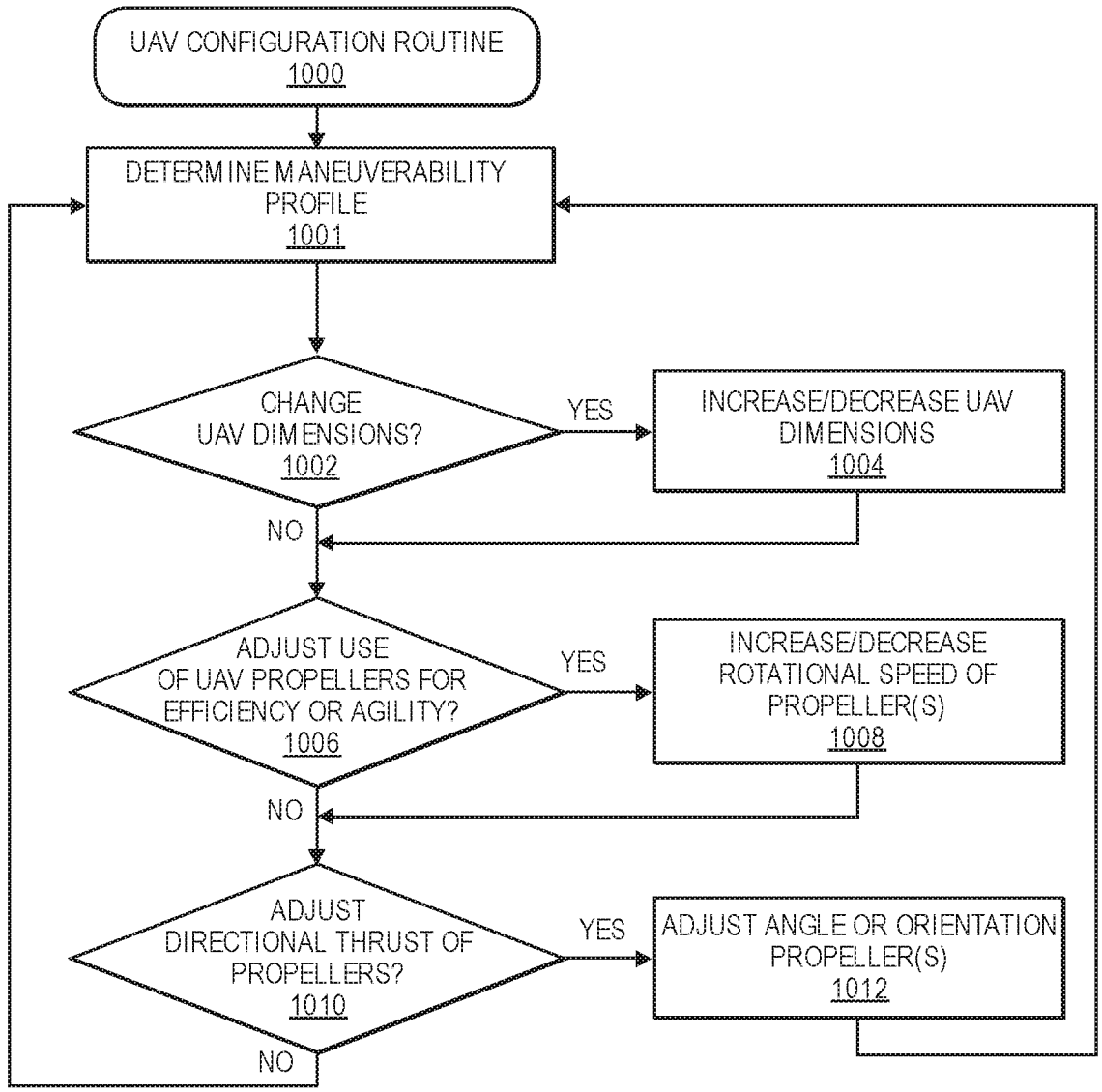
FIG. 10 is a flow diagram illustrating an example unmanned aerial vehicle adjustment routine, according to an implementation.

FIG. 10 is a flow diagram of an example UAV configuration routine 1000. The example routine of FIG. 10 and each of the other routines discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The UAV configuration routine 1000 begins by determining a maneuverability profile for the UAV, as in 1001. As discussed above, the maneuverability profile may specify a UAV configuration and the amount of maneuverability or agility desired for operation of the UAV. The maneuverability profile may be determined based on one or more factors with respect to the UAV, such as, an altitude of the UAV, a velocity of the UAV, objects surrounding the UAV, a location of the UAV, etc. Upon determining the maneuverability profile for the UAV, a determination is made as to whether the UAV dimensions are to be changed, as in 1002. For example, if the maneuverability profile is switched from a power efficiency maneuverability profile to an agility maneuverability profile, and the UAV is currently in an extended configuration, the dimensions of the UAV may need to change so that the UAV is in a contracted configuration, as discussed above. If it is determined that the dimensions of the UAV are to be changed, the UAV control system causes the dimensions of the UAV to increase or decrease accordingly, as in 1004. For example, as illustrated in the figures above, the motor arms may be extended or retracted (e.g., FIGS. 7-9D) and/or the body of the UAV may be extended or retracted around the lifting propellers (e.g., FIGS. 2A-3).

If it is determined that the dimensions of the UAV are not to be changed or, after altering the dimensions of the UAV, a determination is made as to whether the use of one or more of the UAV propellers is to be adjusted for efficiency or agility, as in 1006. For example, as discussed above, during landing, take off, or when operating in areas with several objects nearby, the lifting propeller and corresponding motor may be disengaged and all of the lift and maneuverability of the UAV may be controlled by the maneuverability propellers, thereby increasing the maneuverability and agility of the UAV. If it is determined that the use of the UAV propellers is to be adjusted, the rotational speed of the appropriate propellers is increased or decreased, as in 1008.

However, if it is determined that the use of the propellers is not to be adjusted or, after increasing or decreasing rotational speed of the propellers, a determination is made as to whether the directional thrust of one or more other propellers is to be adjusted, as in 1010. If it is determined that the directional thrust of one or more of the propellers is to be adjusted, the UAV control system causes an adjustment of an angle or orientation of one or more of the propellers, as in 1012. For example, as discussed above, one or more of the lifting propellers and/or the maneuverability propellers may have their angle or orientation adjusted with respect to the body of the UAV, thereby altering the thrust vector direction of the corresponding propeller. After adjusting an angle of orientation of a propeller of the UAV, or if it is determined that the directional thrust vector of the propellers is not to be adjusted, the example routine 1000 returns to block 1001 and continues while the UAV is in flight.

Figure 11:
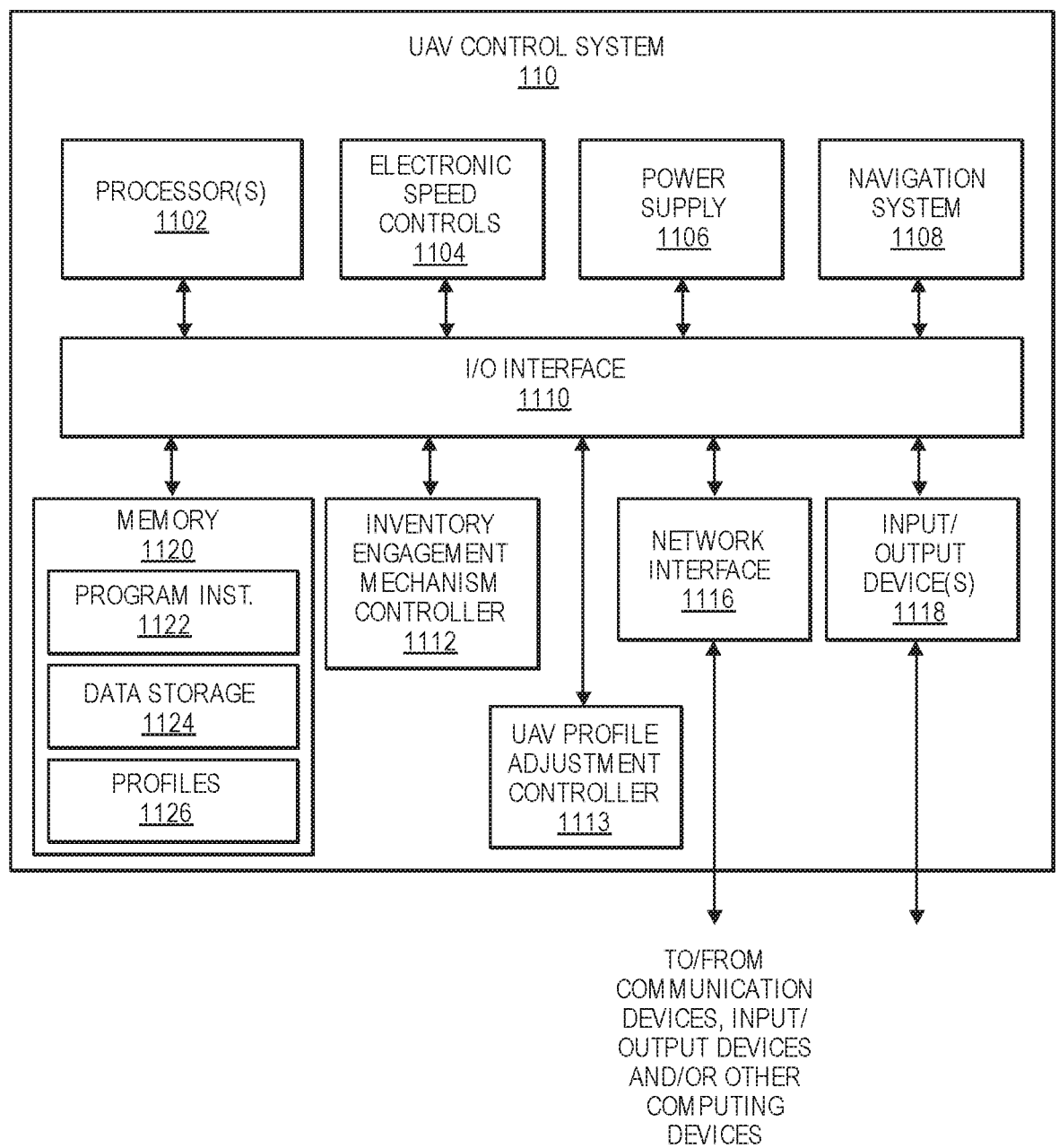
FIG. 11 is a block diagram illustrating various components of an unmanned aerial vehicle control system, according to an implementation.

FIG. 11 is a block diagram illustrating an example UAV control system 110 of the UAV 100. In various examples, the block diagram may be illustrative of one or more aspects of the UAV control system 110 that may be used to implement the various systems and methods discussed above. In the illustrated implementation, the UAV control system 110 includes one or more processors 1102, coupled to a non-transitory computer readable storage medium 1120 via an input/output (I/O) interface 1110. The UAV control system 110 may also include electronic speed controls (ESCs) 1104, power supply module 1106 and/or a navigation system 1108. The UAV control system 110 further includes a payload engagement mechanism controller 1112, a UAV profile adjustment controller 1113, a network interface 1116, and one or more input/output devices 1118.

In various implementations, the UAV control system 110 may be a uniprocessor system including one processor 1102, or a multiprocessor system including several processors 1102 (e.g., two, four, eight, or another suitable number). The processor(s) 1102 may be any suitable processor capable of executing instructions. For example, in various implementations, the processor(s) 1102 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1102 may commonly, but not necessarily, implement the same ISA.

The non-transitory computer readable storage medium 1120 may be configured to store executable instructions, data, flight paths and/or data items accessible by the processor(s) 1102. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1120 as program instructions 1122, data storage 1124 and profile data 1126, respectively. In other implementations, program instructions, data storage and/or profile data may be received, sent or stored upon different types of computer-accessible media, such as non-transitory media, or on similar media separate from the non-transitory computer readable storage medium 1120 or the UAV control system 110. Generally speaking, a non-transitory, computer readable storage medium may include storage media or memory media such as magnetic or optical media, e.g., disk or CD/DVD-ROM, coupled to the UAV control system 110 via the I/O interface 1110. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1116.

In one implementation, the I/O interface 1110 may be configured to coordinate I/O traffic between the processor(s) 1102, the non-transitory computer readable storage medium 1120, and any peripheral devices, the network interface or other peripheral interfaces, such as input/output devices 1118. In some implementations, the I/O interface 1110 may perform any necessary protocol, timing or other data transformations to convert data signals from one component (e.g., non-transitory computer readable storage medium 1120) into a format suitable for use by another component (e.g., processor(s) 1102). In some implementations, the I/O interface 1110 may include support for devices attached through various types of peripheral buses, such as a variant of the Peripheral Component Interconnect (PCI) bus standard or the Universal Serial Bus (USB) standard, for example. In some implementations, the function of the I/O interface 1110 may be split into two or more separate components, such as a north bridge and a south bridge, for example. Also, in some implementations, some or all of the functionality of the I/O interface 1110, such as an interface to the non-transitory computer readable storage medium 1120, may be incorporated directly into the processor(s) 1102.

The ESCs 1104 communicate with the navigation system 1108 and adjust the power of each propeller motor to guide the UAV along a determined flight path. The navigation system 1108 may include a GPS or other similar system than can be used to navigate the UAV to and/or from a location. The payload engagement mechanism controller 1112 communicates with the motor(s) (e.g., a servo motor) used to engage and/or disengage a payload. For example, when the UAV is positioned over a level surface at a delivery location, the payload engagement mechanism controller 1112 may provide an instruction to a motor that controls the payload engagement mechanism to release the payload.

The network interface 1116 may be configured to allow data to be exchanged between the UAV control system 110, other devices attached to a network, such as other computer systems, and/or with UAV control systems of other UAVs. For example, the network interface 1116 may enable wireless communication between numerous UAVs. In various implementations, the network interface 1116 may support communication via wireless general data networks, such as a Wi-Fi network. For example, the network interface 1116 may support communication via telecommunications networks such as cellular communication networks, satellite networks, and the like.

Input/output devices 1118 may, in some implementations, include one or more displays, image capture devices, thermal sensors, infrared sensors, time of flight sensors, accelerometers, pressure sensors, weather sensors, etc. Multiple input/output devices 1118 may be present and controlled by the UAV control system 110. One or more of these sensors may be utilized to assist in the landing, obstacle avoidance and/or to determine a profile or configuration of the UAV. The UAV adjustment controller 1113 communicates with the navigation system 1108 and determines a profile and/or configuration for the UAV. For example, if the UAV is traveling at a high altitude and there are no or few objects, the UAV profile adjustment controller 1113 may specify that the UAV should use a power efficiency profile and/or an expanded configuration.

As shown in FIG. 11, the memory may include program instructions 1122 which may be configured to implement the example processes and/or sub-processes described above. The data storage 1124 may include various data stores for maintaining data items that may be provided for determining flight paths, objects, retrieving a payload, landing, identifying a level surface for disengaging a payload, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 110 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 110 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 110. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from UAV control system 110 may be transmitted to UAV control system 110 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. An aerial vehicle, comprising:
 a body;
 a plurality of motor arms, each of the plurality of motor arms coupled to the body at a respective first end, wherein at least one of the plurality of motor arms is configured to rotate relative to the body around an axis associated with the first end;

a plurality of motors, each of the plurality of motors coupled to a respective second end of a respective one of the plurality of motor arms; and a control system configured to:
selectively control each of the plurality of motors; and
selectively control rotation of the at least one of the plurality of motor arms relative to the body.

2. The aerial vehicle of claim 1, wherein the control system is configured to selectively control rotation of the at least one of the plurality of motor arms between an expanded position and a contracted position relative to the body.

3. The aerial vehicle of claim 1, wherein the control system is configured to selectively control rotation of the at least one of the plurality of motor arms to a desired position relative to the body.

4. The aerial vehicle of claim 1, wherein the control system is configured to selectively control rotation of the at least one of the plurality of motor arms relative to the body to modify at least one of thrust vectoring, agility, maneuverability, or power efficiency of the aerial vehicle.

5. The aerial vehicle of claim 1, wherein each of the plurality of motor arms is configured to rotate relative to the body around respective axes associated with respective first ends.

6. The aerial vehicle of claim 5, wherein the control system is configured to selectively control rotation of each of the plurality of motor arms to respective desired positions relative to the body.

7. The aerial vehicle of claim 5, wherein the control system is configured to selectively control rotation of each of the plurality of motor arms relative to the body to modify at least one of thrust vectoring, agility, maneuverability, or power efficiency of the aerial vehicle.

8. The aerial vehicle of claim 1, further comprising:
a navigation system including a global positioning system (GPS) and an accelerometer configured to determine a position and orientation of the aerial vehicle.

9. The aerial vehicle of claim 1, wherein the at least one of the plurality of motor arms is coupled to the body via a pivot point associated with the first end.

10. A method of operating an aerial vehicle, comprising:
determining, by a control system, a desired position of at least one motor arm configured to rotate relative to a body around an axis associated with a first end of the at least one motor arm, wherein the aerial vehicle comprises the body, a plurality of motor arms coupled to the body at respective first ends, and a plurality of motors coupled to respective second ends of respective ones of the plurality of motor arms;
causing rotation, by the control system, of the at least one motor arm to the desired position relative to the body; and
causing operation, by the control system, of the plurality of motors.

11. The method of claim 10, wherein the control system is configured to selectively cause rotation of the at least one motor arm between an expanded position and a contracted position relative to the body.

12. The method of claim 10, wherein the control system is configured to selectively cause rotation of the at least one motor arm relative to the body to modify at least one of thrust vectoring, agility, maneuverability, or power efficiency of the aerial vehicle.

13. The method of claim 10, wherein each of the plurality of motor arms is configured to rotate relative to the body around respective axes associated with respective first ends.

14. The method of claim 13, further comprising:
determining, by the control system, respective desired positions of each of the plurality of motor arms configured to rotate relative to the body; and
causing rotation, by the control system, of each of the plurality of motor arms to the respective desired positions relative to the body.

15. The method of claim 14, wherein the control system is configured to selectively cause rotation of each of the plurality of motor arms relative to the body to modify at least one of thrust vectoring, agility, maneuverability, or power efficiency of the aerial vehicle.

16. The method of claim 10, further comprising:
determining, by the control system, a position and orientation of the aerial vehicle based at least in part on a navigation system including a global positioning system (GPS) and an accelerometer.

17. The method of claim 10, wherein the at least one motor arm is coupled to the body via a pivot point associated with the first end.

18. An unmanned aerial vehicle, comprising:
a body;
a plurality of motor arms, each of the plurality of motor arms coupled to the body at a respective first end, and configured to rotate relative to the body around a respective pivot point associated with the respective first end;
a plurality of motors, each of the plurality of motors coupled to a respective second end of a respective one of the plurality of motor arms; and
a control system configured to:
selectively control rotation of each of the plurality of motor arms relative to the body to modify at least one of thrust vectoring, agility, maneuverability, or power efficiency of the unmanned aerial vehicle.

19. The unmanned aerial vehicle of claim 18, wherein the unmanned aerial vehicle is a quadcopter, the plurality of motor arms including four motor arms, and the plurality of motors including four motors.

20. The unmanned aerial vehicle of claim 18, wherein the control system is further configured to:
selectively control rotation of each of the plurality of motor arms to respective desired positions relative to the body; and
selectively control each of the plurality of motors.

* * * * *